(12) United States Patent
Shimada et al.

(10) Patent No.: US 7,213,416 B2
(45) Date of Patent: May 8, 2007

(54) GLASS BASE MATERIAL PRODUCING DEVICE

(75) Inventors: Tadakatsu Shimada, Gunma-ken (JP); Yuuji Tobisaka, Gunma-ken (JP); Kazuhisa Hatayama, Gunma-ken (JP); Hideo Hirasawa, Gunma-ken (JP)

(73) Assignee: Shin-Etsu Chemical Co., LTD., Tokyo (JP)

( * ) Notice: Subject to any disclaimer, the term of this patent is extended or adjusted under 35 U.S.C. 154(b) by 582 days.

(21) Appl. No.: 10/343,314

(22) PCT Filed: Jul. 18, 2001

(86) PCT No.: PCT/JP01/06271

§ 371 (c)(1),
(2), (4) Date: Jun. 16, 2003

(87) PCT Pub. No.: WO02/10079

PCT Pub. Date: Feb. 7, 2002

(65) Prior Publication Data

US 2003/0233849 A1    Dec. 25, 2003

(30) Foreign Application Priority Data

Jul. 31, 2000 (JP) ............................. 2000-230508
Aug. 2, 2000 (JP) ............................. 2000-234108
Aug. 7, 2000 (JP) ............................. 2000-238502

(51) Int. Cl.
  C03B 37/07   (2006.01)
  C03B 37/018  (2006.01)

(52) U.S. Cl. ........................... 65/484; 65/530; 65/531; 65/534

(58) Field of Classification Search .................. 65/484, 65/421, 530–532, 534
See application file for complete search history.

(56) References Cited

U.S. PATENT DOCUMENTS 4,173,305 A * 11/1979 Blankenship ................. 239/79

(Continued)

FOREIGN PATENT DOCUMENTS

EP     0 476 218 A1     2/1991

(Continued)

OTHER PUBLICATIONS

Machine translation of JP2001-019441 retrived from http://dossier1.ipdl.ncipi.go.jp/AIPN/odse_top_dn.ipdl?N0000=7400 on Apr. 27, 2006.*

(Continued)

*Primary Examiner*—Eric Hug
*Assistant Examiner*—Carlos Lopez
(74) *Attorney, Agent, or Firm*—McGinn IP Law Group, PLLC.

(57) ABSTRACT

A glass base material manufacturing apparatus for manufacturing a glass base material comprising: a plurality burners, arranged in a row at a predetermined intervals along the longitudinal direction of a starting base material of the glass base material, for forming a deposit, which is a base material of the glass base material by depositing glass soot on the starting base material while moving reciprocatory over a section of the entire length of the starting base material along the longitudinal direction of the starting base material; a plurality of flow rate regulators, at least one of which is connected to the plurality of burners, respectively, for regulating a flow rate of raw material gas of the glass soot, which is supplied to the plurality of burners; and a control unit connected to each of the plurality of flow rate regulators for controlling individually the plurality of flow rate regulators.

34 Claims, 17 Drawing Sheets

U.S. PATENT DOCUMENTS 6,301,936 B1 * 10/2001 Ohga et al. .................. 65/531
6,546,759 B1 *  4/2003 Tobisaka et al. ............. 65/531

FOREIGN PATENT DOCUMENTS

| EP | 0 976 690 A2 | 2/2000 |
| EP | 1 044 931 | 10/2000 |
| EP | 1 065 175 A1 | 1/2001 |
| JP | 03-228845 | 10/1991 |
| JP | 3-279234 | 12/1991 |
| JP | 10-310441 | 11/1998 |
| JP | 2000-44276 | 2/2000 |
| JP | 2000-169174 | 6/2000 |
| JP | 2001019441 A * | 1/2001 |
| WO | WO99/33755 | 8/1999 |

OTHER PUBLICATIONS

International Preliminary Examination Report (IPER) (PCT Form 409) dated Jul. 18, 2001.
International Search Report (PCT Form 210) dated Oct. 17, 2001.
English translation of International Preliminary Examination Report (IPER) (PCT Form 409) dated Jul. 18, 2001.
European Search Report, dated May 31, 2005.

* cited by examiner

GLASS BASE MATERIAL PRODUCING DEVICE

This is the U.S. national stage of PCT/JP01/06271 filed on Jul. 18, 2001, further of a Japanese patent application, 2000-230508 filed on Jul. 31, 2000, 2000-234108 filed on Aug. 2, 2000, 2000-238502 filed on Aug. 7, 2000, the contents of which are incorporated herein by reference.

BACKGROUND OF THE INVENTION

1. Field of the Invention

The present embodiment relates to a glass base manufacturing apparatus and method thereof. More particularly, the present embodiment relates to a glass base manufacturing apparatus and method thereof for manufacturing a glass base material, which is a base material of an optical fiber.

2. Description of the Related Art

FIG. 1 shows the configuration of a conventional glass base material manufacturing apparatus. A glass base material manufacturing apparatus has a chuck 12 and burners 22A–22D. A chuck 12 hold the both ends of the starting base material 2. Furthermore, a chuck 12 rotates the starting base material 2 around the axis of the starting base material 2. The burners 22A–22D are arranged at equal intervals in the row along the longitudinal direction of the starting base material 2. Raw material gas, fuel gas, and assist combustion gas are supplied to the burners 22A–22D. The burners 22A–22D hydrolyze the supplied raw material gas while moving reciprocatory along the longitudinal direction of the starting base material 2 and ejecting glass soot to the starting base material 2. The deposit 10 is formed by depositing glass soot around the starting base material 2 with the burners 22A–22D.

The glass base material used as base material of an optical fiber is manufactured by heat-treating and vitrifying the glass soot deposited on the circumference of the starting base material 2. An optical fiber preform is obtained by elongating and reducing the diameter of a glass base material to the form suitable for drawing, and an optical fiber is manufactured by drawing the glass base material.

FIG. 2 shows a deposit amount of the glass soot by the burners 22A–22D according to a full-range traverse method. In the case of the full-range traverse method, all the burners 22A–22D move reciprocatory from one end of a region, on which glass soot is deposited, to another end of the region while moving beyond an effective part, which can be effectively used as a glass base material product. Furthermore, each burner 22A–22D deposits glass soot for a specific deposit amount at uniform thickness within the range of the effective part. Therefore, the whole thickness of the deposited glass soot becomes substantially uniform along the moving direction of the burners 22A–22D even when the deposited amount of the glass soot of each burner 22A–22D is different, respectively.

FIG. 3 shows a deposited amount of the glass soot by the burners 22A–22F according to the partial traverse method. In the case of the partial traverse method, the burners 22A–22F deposit glass soot on the starting base material 2 while moving reciprocatory over a part of the section of the whole length of the starting base material 2. For example, the starting position of the reciprocate movement of each of the burners 22A–22F is shifted partially and sequentially, and glass soot is deposited on the starting base material 2 (as referred to in Japanese Patent Application Laid-Open No. 3-228845).

Since the partial traverse method can increase the number of the burners without increasing the unnecessary part, which cannot be used as a glass base material product, as compared with the full-range traverse method as shown in FIG. 2, the partial traverse method can increase the speed for depositing glass.

However, in case of the partial traverse method, each burner 22A–22F moves reciprocatory a part of sections of the whole length of the effective part. Therefore, as shown in FIG. 3, when the deposited amount of glass soot is different for each of the burners, the whole thickness of the deposited glass soot becomes uneven along the longitudinal direction of the effective part.

If the deposited amount of the glass soot along the longitudinal direction of the starting base material 2 is not uniform, the glass base material, which is generated by vitrifying the deposit 10, has a clad, which is deposited around a core, having a varied thickness.

Therefore, if a preform is manufactured by elongating and reducing the diameter of a glass base material having a clad, the thickness of which is not uniform, and an optical fiber, which is the final product, is manufactured by drawing the preform, the diameter of the core of the optical fiber will fluctuate. Since light propagates inside a core, if the core diameter is changed, a predetermined characteristic required for an optical fiber cannot be acquired. Therefore, when the deposited amount of glass soot is uneven along the longitudinal direction of the effective part, the process for grinding the part, where the thickness of the deposited amount is large, to make the thickness to be uniform becomes necessary, and the manufacturing cost thus increases.

SUMMARY OF THE INVENTION

Therefore, it is an object of the present embodiment to provide a glass base manufacturing apparatus and method thereof which overcomes the above issues in the related art. This object is achieved by combinations described in the independent claims. The dependent claims define further advantageous and exemplary combinations of the present embodiment.

According to the first aspect of the present embodiment, a glass base material manufacturing apparatus for manufacturing a glass base material, which is used as a base material of an optical fiber, comprises: a plurality burners, arranged in a row at predetermined intervals along the longitudinal direction of a starting base material of the glass base material, for forming a deposit, which is a base material of the glass base material by depositing glass soot on the starting base material while moving reciprocatory over a section of the entire length of the starting base material along the longitudinal direction of the starting base material; a plurality of flow rate regulators, at least one of which is connected to the plurality of burners, respectively, for regulating a flow rate of raw material gas of the glass soot, which is supplied to the plurality of burners; and a control unit connected to each of the plurality of flow rate regulators for controlling individually the plurality of flow rate regulators.

The control unit may have: a first control unit which controls a plurality of the flow rate regulators so that the raw material gas of a base flow rate is supplied to the plurality of the burners; and a second control unit which controls each of the plurality of flow rate regulators according to a correction value of flow rate of the raw material gas supplied to the burners, the correction value being calculated for each of the plurality of burners over the base flow rate.

The second control unit may calculate the correction value for each of the plurality of flow rate regulators based on a deposition ratio of the glass base material, which is formed by vitrifying the deposit actually deposited by the plurality of burners.

The second control unit may adjust the correction value for each of the plurality of flow rate regulators according to a ratio between a deposition ratio of first glass base material, which is formed by vitrifying the deposit formed by controlling the flow rate regulators using the first control unit corresponding to each position of the plurality of burners, and a deposition ratio of second glass base material, which is formed by vitrifying the deposit formed by controlling the flow rate regulators using the first control unit and the second control unit.

The control unit may be connected to a preform analyzer, which measures the outside diameter and the core diameter of the glass base material. The second control unit may calculate the correction value to be 50% less than the base flow rate. The first control unit may control the flow rate regulator so that an amount of the raw material gas supplied to the burners is changed with the progress of time. The plurality of flow rate regulators may be connected to one of the burners. The plurality of flow rate regulators may control different types of flow rate of the raw material gas, respectively.

The glass base material manufacturing apparatus may further comprise: a first moving mechanism that moves the plurality of burners reciprocatory in a first cycle along the longitudinal direction of the starting base material; and a second moving mechanism that moves the first moving mechanism reciprocatory in a second cycle, the cycle of the second cycle being longer than the first cycle.

The glass base material manufacturing apparatus may further comprise: a reaction vessel which accommodates the plurality of burners; and a deformation reduction mechanism, which reduces a deformation of, the reaction vessel caused by heat generated when manufacturing the glass base material. The deformation reduction mechanism may include a flexural structure part formed in the reaction vessel. The flexural structure part may be formed around the reaction vessel. The deformation reduction mechanism may include deformation restriction unit, which restricts deformation of the reaction vessel. The deformation reduction mechanism may include at least one of the deformation restriction units provided around a circumference of the reaction vessel.

A material of the deformation restriction unit may be carbon steel or stainless steel. The material of the deformation restriction unit may be a steel pipe having a square cross section. The reaction vessel may have a wall, the surface of which is continuous flexural shape, as the deformation reduction mechanism. The reaction vessel may have a slide part, in which a part of a wall of the reaction vessel slides to be overlapped with another part of the wall of there action vessel, as the deformation reduction mechanism. The reaction vessel may have the slide part around the circumference of the reaction vessel.

The glass base material manufacturing apparatus may further have a holding unit, which holds the deposit and transports the deposit outside the glass base material manufacturing apparatus; and the holding unit has a means to hold a conical part, which is formed on both ends of the deposit. The holding unit may have a concave part, an angle of which is substantially the same as an inclination of an angle of the conical part of the deposit. The concave part may be a curved groove. The concave part may be a substantially V-shaped groove.

The holding unit may have a clamp, which includes a concave part that holds the conical part by sandwiching the conical part from both of an upper side and a lower side of the conical part. The plurality of clamps may be rotated around an axis, which couples the plurality of clamps with each other.

The holding unit may have a clamp including the concave part, which holds the conical part by sandwiching the conical part; and a holding angle adjustment unit for adjusting an angle of the concave part of the clamp to be substantially the same as an angle of an inclination of a part of the conical part. The holding angle adjustment unit may rotate the clamp around a longitudinal direction of the clamp as an axis. The holding unit may have a holding pressure adjustment unit for holding the conical part by substantially uniform pressure. The holding pressure adjustment unit may be an elastic body formed on a surface of the clamp that has contact with the conical part.

The holding pressure adjustment unit may have a plurality of columnar objects each of which moves telescopically according to a curved surface of the conical part. The holding unit may have a mechanism for adjusting a position of the clamp in the axial direction of the deposit. The mechanism for adjusting the position of the clamp may have an arm that supports the clamp and screw shaft, which engages with the arm and moves the arm in the axial direction of the deposit.

According to the second aspect of the present embodiment, a method for manufacturing a glass base material used as a base material of an optical fiber, comprises: depositing glass soot on a starting base material of the glass base material by ejecting glass soot from a plurality of burners to the starting base material while moving the plurality of burners reciprocatory over a section of the entire length of the starting base material along the longitudinal direction of the starting base material; and controlling f low rate of raw material gas of the glass soot supplied to the plurality of burners, individually for each of the plurality of burners.

The method may further comprise: vitrifying a deposit of the glass soot deposited to generate the glass base material; and the controlling may control the flow rate of the raw material gas individually for each of the plurality of burners based on a deposition ratio of the glass base material generated by the vitrifying.

The depositing of glass soot may have a first batch depositing that deposits the glass soot on the starting base material to generate a first batch of the deposit by supplying the raw material gas of a base flow rate to the plurality of burners; and the vitrifying of deposit may have a first batch vitrifying that vitrifies the first batch of the deposit to generate a first batch of the glass base material; and calculating a correction value of a flow rate of the raw material gas, which is supplied to the burners, over the base flowrate for each of the plurality of burners based on the deposition ratio of the first batch of the glass base material generated by the first batch vitrifying.

The depositing of glass soot may further have a second batch depositing that generates a second batch of the deposit by depositing the glass soot on the starting base material by supplying the raw material gas to each of the plurality of burners, respectively according to a correction value, which is obtained by correcting the correction value calculated by calculating over the base flow rate.

The controlling of flow rate may have first batch controlling that controls a flow rate of the raw material gas to supply the raw material gas of the base flow rate to the plurality of burners on the first batch depositing; and second batch controlling that controls a flow rate of the raw material gas supplied to each of the plurality of burners individually according to a value, which is obtained by correcting the correction value over the base flow rate, on the second batch depositing.

The calculating may calculate the correction value for each of the plurality of burners based on a deposition ratio of the first batch of the glass base material generated by the first batch vitrifying.

The vitrifying of deposit may further have a second batch vitrifying that vitrifies the second batch of the deposit generated by the second batch depositing to generate a second batch of the glass base material; and the method may further comprise: calculating the correction value for each of the plurality of burners based on a ratio between a deposition ratio of the first batch of the glass base material generated by the first batch vitrifying corresponding to each position of the plurality of burners and a deposition ratio of the second batch of the glass base material generated by the second batch vitrifying.

The depositing of glass soot may further have a third batch depositing that generates a third batch of the deposit by depositing the glass soot on the starting base material by supplying the raw material gas to each of the plurality of burners based on a value obtained by correcting the correction value calculated by the calculating over the base flow rate; and the controlling may further have a third batch controlling that individually controls the flow rate of the raw material gas supplied to each of the plurality of burners based on a value obtained by correcting the calculated correction value over the base flow rate; and the vitrifying may further have a third batch vitrifying that vitrifies the third batch of the deposit generated by the third batch depositing to generate a third batch of the glass base material.

The calculating may calculate the correction value to be 50% or less of the base flow rate. The first batch controlling may control the flow rate of the raw material gas supplied to the burners to be changed with the progress of time. The first batch depositing and second batch depositing may supply a plurality type of the raw material gas to one of the burners; and the first batch controlling and the second batch controlling may control individually each flow rate of the plurality types of the raw material gas. The method may further comprise: holding the glass base material; and the holding may hold a conical part formed on both ends of the glass base material.

This summary of the invention does not necessarily describe all the necessary features of the present embodiment. The present embodiment may also be a sub-combination of the above described features. The above and other features and advantages of the present embodiment will become more apparent from the following description of embodiments taken in conjunction with the accompanying drawings.

DETAILED DESCRIPTION OF THE INVENTION

The invention will now be described based on the preferred embodiments, which do not intend to limit the scope of the present embodiment, but exemplify the invention. All of the features and combinations thereof described in the embodiment are not necessarily essential to the invention.

Figure 4:
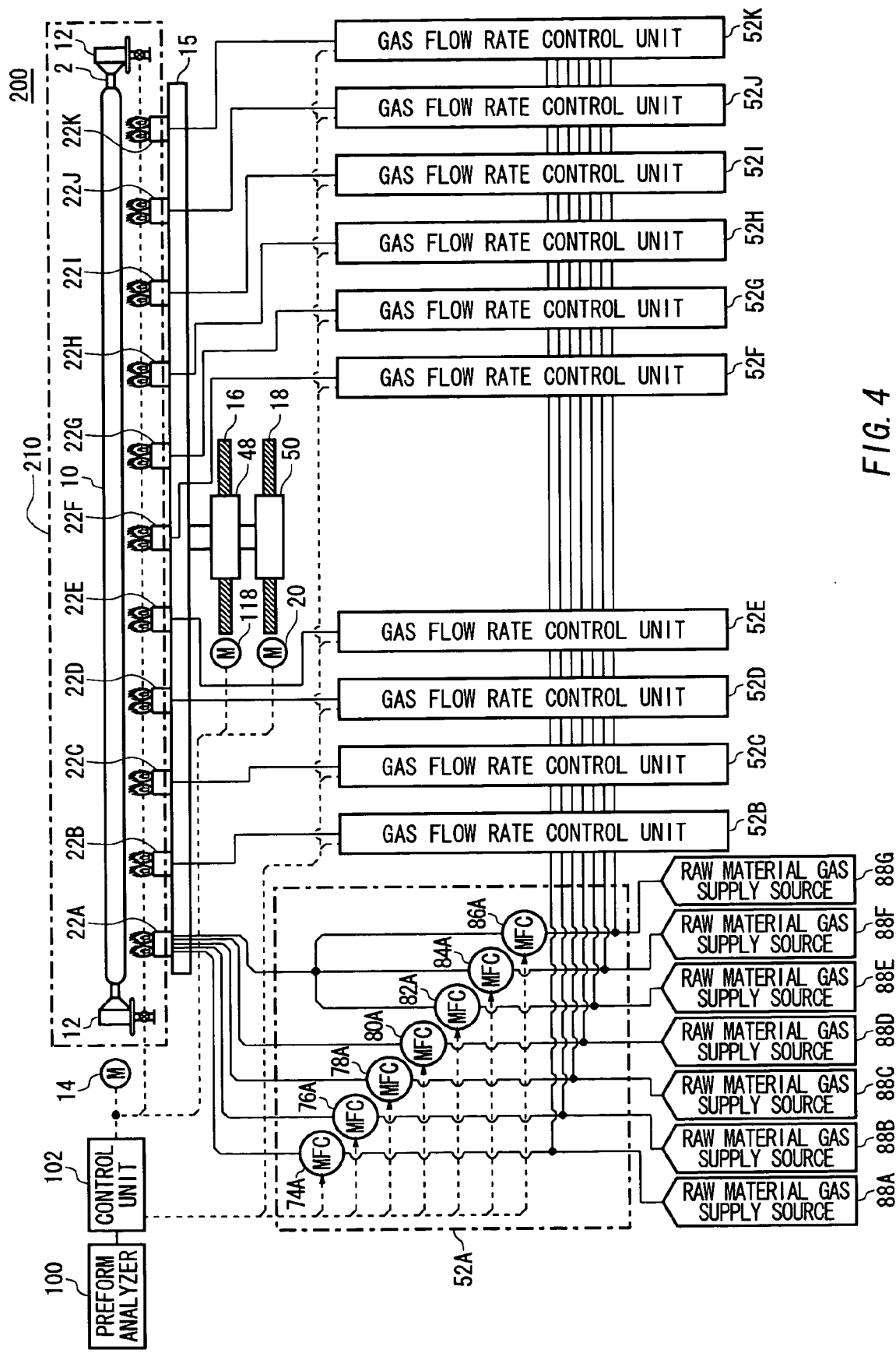
FIG. 4 shows an example of the glass base material manufacturing apparatus 200 of the present embodiment.

FIG. 4 shows an example of the glass base material manufacturing apparatus 200 of the present embodiment. The glass base material manufacturing apparatus 200 has chucks 12, motors 14, 20, and 118, burners 22A–22K, gas flow rate control units 52A–52K, raw material gas supply sources 88A–88G, a control unit 102, a first moving mechanism 48, a second moving mechanism 50, and a reaction vessel 210.

The chucks 12 hold the starting base material 2. The motor 14 rotates the starting base material 2 by rotating the chucks 12 around the axis of the starting base material 2.

The burners 22A–22K are arranged in a row at predetermined intervals along the longitudinal direction of the starting base material 2 on a stand 15. The burners 22A–22K move reciprocatory over a section of the whole length of the starting base material 2 while moving the turning position of the reciprocatory movement along the longitudinal direction of the starting base material 2. That is, the burners 22A–22K of the present embodiment move reciprocatory according to the partial traverse method. The burners 22A–22K form the deposit 10 by depositing glass soot on the starting base material 2.

The first moving mechanism 48 has a first moving axis 16 arranged parallel with the longitudinal direction of the starting base material 2. The first moving mechanism 48 moves the stand 15 reciprocatory with a first cycle parallel with the longitudinal direction of the starting base material by rotating the first moving axis 16 by the motor 118. Here the cycle means the time interval required for one lap of the reciprocate movement of the burners 22A–22K. The second moving mechanism 50 is provided on the lower part of the first moving mechanism 48, and the second moving mechanism 50 moves the first moving mechanism 48 reciprocatory. The second moving mechanism 50 has a second moving axis 18 arranged in parallel with the longitudinal direction of the first moving axis 16.

The second moving mechanism 50 moves the first moving mechanism 48 reciprocatory with a second cycle, which is longer than the first cycle, by rotating the second moving axis 18 using the motor 20. Therefore, the first moving mechanism 48 moves the burners 22A–22E reciprocatory at a fast speed, and the second moving mechanism 50 moves the first moving mechanism 48 reciprocatory at a speed slower than the first moving mechanism.

The gas flow control units 52A–52K are connected to corresponding burners 22A–22K, respectively. The gas flow control units 52A–52K supply raw material gas to corresponding burners 22A–22K, respectively. As raw material gas, the gas, which is raw material of glass soot, combustion gas, and assist combustion gas are supplied to a burner. The raw-material-gas-supply-sources 88A–88G supply seven types of different raw material gas, respectively, to each of the gas flow control units 52A–52K. As shown in FIG. 4, since the raw-material-gas-supply-sources 88A–88G is connected to all the gas flow control units 52A–52K, respectively, the raw-material-gas-supply-sources 88A–88G supply seven types of different raw material gas to all the gas flow control units 52A–52K, respectively.

Each of the gas flow control units 52A–52K has a plurality of flowrate regulators 74, 76, 78, 80, 82, 84, and 86, respectively. For example, the gas flow control unit 52A has the flow rate regulators 74A, 76A, 78A, 80A, 82A, 84A, and 86A. The flow rate regulators 74A, 76A, 78A, 80A, 82A, 84A, and 86A are connected to the corresponding raw-material-gas-supply-sources 88A–88G, respectively. Therefore, the flow rate regulators 74A, 76A, 78A, 80A, 82A, 84A, and 86A control the flow of different types of the raw material gas supplied from the corresponding raw-material-gas-supply-sources 88A–88G, respectively.

A part of the raw material gas supplied from the raw-material-gas-supply-sources 88A–88G, the flow of which was controlled by each of the flow rate regulators 74A, 76A, 78A, 80A, 82A, 84A, and 86A, respectively, joins and is supplied to the burner 22A. The raw material gas, which does not join, such as fuel gas and assist combustion gas, is supplied to each of plurality of the nozzles in the burner 22A. In the example shown in FIG. 4, the raw material gas supplied from the flow rate regulators 82A, 84A, and 86A is joined and supplied to the nozzle of the burner 22A. Each raw material gas supplied from the flow rate regulators 74A, 76A, 78A, and 80A is separately supplied to the corresponding nozzles of the burner 22A. The embodiment for supplying the raw material gas to the burner 22 is not restricted to the example shown in FIG. 4, and other embodiments may be used.

Since the gas flow control units 52B–52K have the same configuration with that of the gas flow control unit 52A, the explanation of which is abbreviated. Moreover, since the configuration inside the gas flow control units 52B–52K is same as that of the gas flow control unit 52A, the configuration inside the gas flow control units 52B–52K is not shown in FIG. 4.

Moreover, the quantity of the raw material gas supplied to each burner 22A–22K may be controlled using other means, without using the flow rate regulators 74, 76, 78, 80, 82, 84, and 86 shown in FIG. 4. For example, the amount of raw material gas supplied to each burner 22A–22K may be adjusted by arranging the distribution unit for each of the burners 22A–22K and further arranging the adjustable valve or orifice on the piping, which extends from the distribution unit to each burner 22A–22K, and increasing or decreasing the pressure loss of a valve or an orifice.

The control unit 102 is connected to each of the flow rate regulators 74, 76, 78, 80, 82, 84, and 86 of the gas flow control units 52A–52K. For example, the control unit 102 is connected to each of the flow rate regulators 74A, 76A, 78A, 80A, 82A, 84A, and 86A inside the gas flow control unit 52A. The control unit 102 controls individually the flow in the flow rate regulators 74, 76, 78, 80, 82, 84, and 86, respectively. The control unit 102 does not need to control all the flow rate regulators 74, 76, 78, 80, 82, 84, and 86, and may control some of the flow rate regulators.

The control unit 102 may control the flow rate regulators 74, 76, 78, 80, 82, 84, and 86 so that the quantity of the raw material gas supplied to burners 22A–22K changes with the progress of time. For example, the flow rate of the raw material gas to be supplied may be changed according to the growth of the deposition of glass soot in each stages of early stage, middle stage, and later stage. The control unit 102 is connected to the motors 14, 20, and 118, and the control unit 102 controls the rotation speed of a chuck 12, the first moving axis 16, and the second moving axis 18.

The reaction vessel 210 accommodates a chuck 12 and the burners 22A–22K. The reaction vessel 210 protects the composing elements of the glass base material manufacturing apparatus 200 by isolating the composing elements of the glass base material manufacturing apparatus 200, such as the first moving mechanism 48, the second moving mechanism 50, and the gas flow control units 52A–52K, from the heat generated during the reaction of the raw material gas. The reaction vessel 210 does not need to accommodate all the above-mentioned elements, and the reaction vessel 210 may accommodate a part of above-mentioned elements.

Furthermore, the glass base material manufacturing apparatus 200 may be connected to the preform analyzer 100, which measures the outside diameter and the core diameter of the glass base material. The deposit 10 manufactured by the glass base material manufacturing apparatus 200 is sintered to be a glass base material by the sintering apparatus, which is provided separately with the glass base material manufacturing apparatus 200.

The outside diameter and the core diameter are measured by the preform analyzer 100, which is provided separately with the glass base material manufacturing apparatus 200. The data related to the outside diameter and the core diameter of the glass base material can be input to the control unit 102 from the preform analyzer 100 by connecting the preform analyzer 100 to the control unit 102. The control unit 102 may control each flow rate of the flow rate regulators 74, 76, 78, 80, 82, 84, and 86 based on the data related to the outside diameter and the core diameter of the glass base material which is input from the preform analyzer 100.

Figure 5:
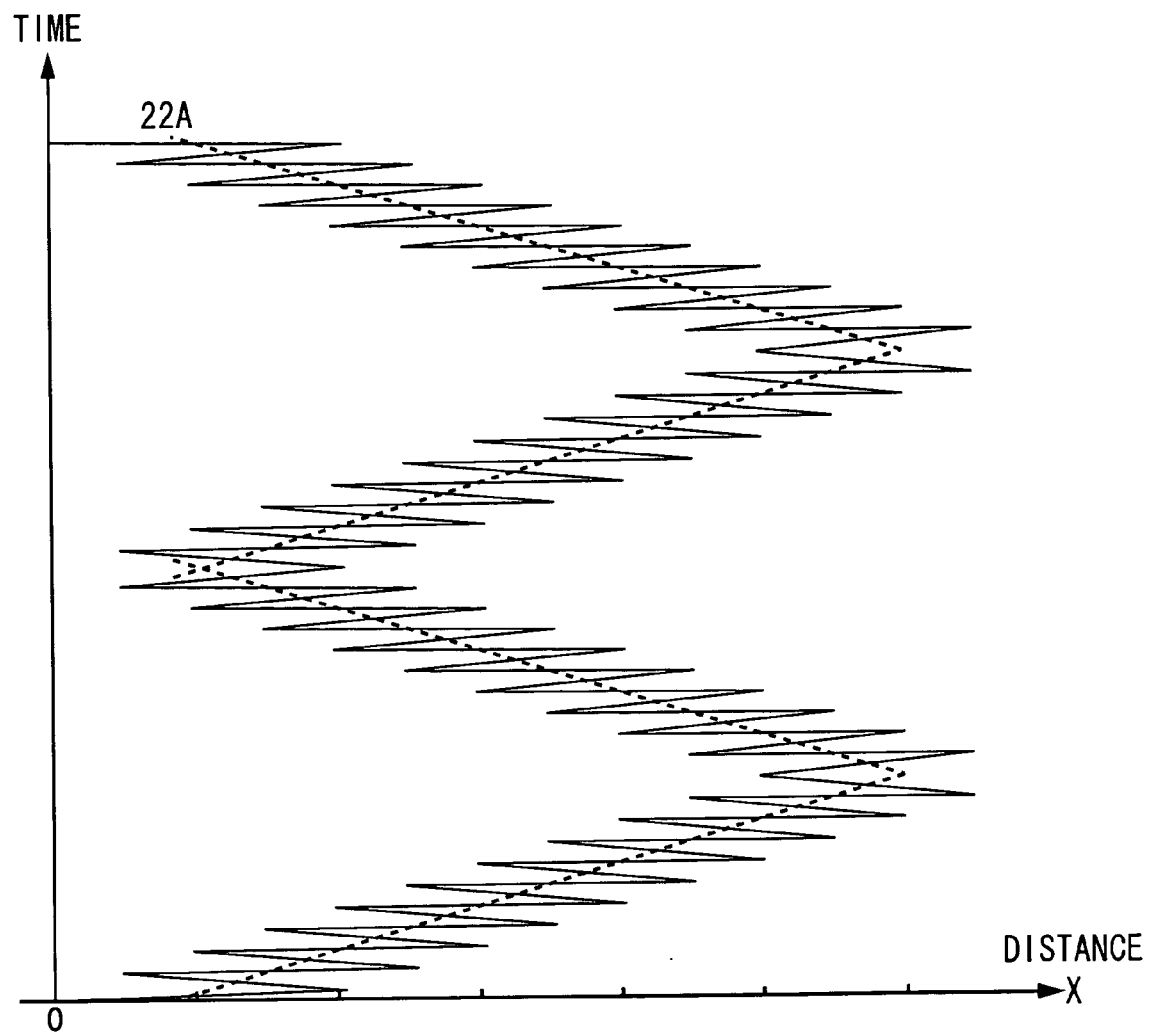
FIG. 5 shows the trajectory of the burner 22A by the reciprocatory movement of the burner 22A.

FIG. 5 shows the trajectory of the burner 22A by the reciprocatory movement of the burner 22A. The glass base material manufacturing apparatus 200 shown in FIG. 4 has 11 burners 22A–22K. However, in order to simplify the explanation, only one moving trajectory of the burner 22A is shown. A vertical axis shows the progress of time and a horizontal axis shows the moving distance of the burner 22A.

The first moving mechanism 48 moves the burner 22A reciprocatory with the first cycle as shown by the solid line in FIG. 5. The moving width of the first moving cycle is a part of the section to the whole length of the starting base material 2. The second moving mechanism 50 moves the first moving mechanism 48 reciprocatory with the second cycle as shown by the hidden line in FIG. 5. The moving width of the second moving cycle is also a part of the section to the whole length of the starting base material 2. At least one of the moving width of the first moving mechanism 48 and the moving width of the second moving mechanism 50 is preferably to be an integral multiple of an interval among the installed burners. The moving width of the second moving cycle is preferably to be an integral multiple of the interval of each of the burners 22A–22K. For example, it can be from once to twice of the interval of each of the burners 22A–22K.

Although the moving width of the first moving cycle is smaller than the moving width of the second moving cycle in FIG. 5, the moving width of the first moving cycle may be equal to the moving width of the second moving cycle. The trajectory of the movement of the burner 22A becomes a trajectory, which is obtained by the superposition of the trajectory of the first cycle shown by a solid line on the trajectory of the second cycle shown by a hidden line. Therefore, since the glass base material manufacturing apparatus 200 of the present embodiment has the first moving mechanism 48 and the second moving mechanism 50, it can move the turning position of the reciprocatory movement of the burners 22A–22K.

Figure 6:
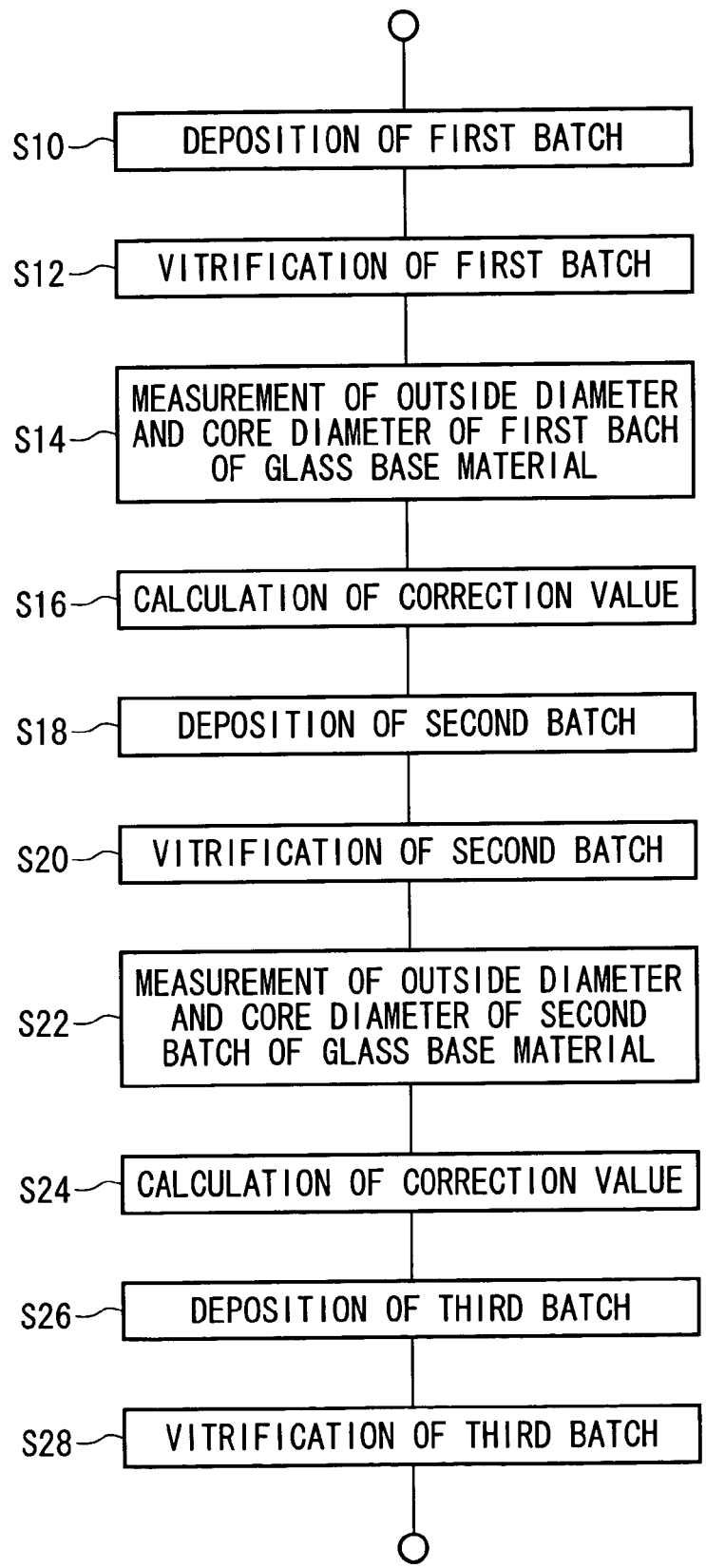
FIG. 6 shows a process for manufacturing the glass base material using the glass base material manufacturing apparatus 200 shown in FIG. 4.

FIG. 6 shows a process for manufacturing the glass base material using the glass base material manufacturing apparatus 200 shown in FIG. 4. First, the deposit of the first batch is generated by supplying the raw material gas to each burner 22A–22K with a basic flow rate and depositioning glass soot on the starting base material (S10). The basic flow rate is a flow rate, in which the supply amount of the raw material gas supplied to each burners 22A–22K is made to be equal ignoring the pressure loss, which is different for each of the burners 22A–22. Therefore, the control unit 102 provides the same output signal to each gas flow control units 52A–52K even if the pressure loss is different for each of the burners 22A–22. Therefore, the raw material gas having the same flow rate is supplied to each of the burners 22A–22K, respectively, from the corresponding gas flow control units 52A–52K.

Next, the first batch of the glass base material is generated by heat-treating and vitrifying the first batch of the deposit generated by the deposition of the first batch (S10) using the sintering apparatus, which is not shown in figures and is provided separately with the glass base material manufacturing apparatus 200 (S12).

The relationship between the thickness of the deposit 10 and the thickness of the glass base material after the vitrification is changed with the bulk density of a deposit. Therefore, it is difficult to judge whether the amount of deposition of the deposit 10 is uniform along the longitudinal direction of the starting base material 2 in the stage before vitrifying the deposit 10 into a transparent glass.

Furthermore, the refractive-index distribution inside the glass base material is obtained by transmitting such as laser light through the glass base material using the preform analyzer 100, provided separately with the glass base material manufacturing apparatus 200 and measuring a gap of the position of the light which was transmitted through the glass base material. The outside diameter of the glass base material can be obtained from the obtained refractive-index distribution. Therefore, the preform analyzer 100 cannot be used for the white and porous deposit 10 at the stage before vitrifying the deposit 10 because the light cannot transmit through the deposit 10. Therefore, in order to judge whether the amount of deposition of the deposit 10 is uniform along the longitudinal direction of the starting base material 2 using the preform analyzer 100, it is necessary to sinter and vitrify the deposit 10 into transparent glass.

Next, the outside diameter and the core diameter of the first batch of the glass base material are measured (S14). For example, the outside diameter of the first batch of the glass base material and the outside diameter or the core diameter of the first batch of the starting base material 2 are measured using the preform analyzer 100. The distribution of the ratio between the outside diameter of the first batch of the glass base material and the outside diameter or the core diameter of the first batch of the starting base material, i.e., a deposition ratio distribution, is measured by this measurement. The deposition characteristic of the glass soot of each burner 22A–22K can be known by coordinating the measured deposition ratio distribution to the deposition range of each burner 22A–22K.

A deposition ratio distribution is calculated based on the following formulas.

A rate of a core rod=(outside diameter of a starting base material)/(outside diameter of a glass base material)

A deposition ratio=(1/rate of a core rod at a measurement position)/(1/rate of a core rod at a standard position)

Here, "a core rod" in the formula means "the starting base material 2".

Next, the correction value of the flow rate of the raw material gas supplied to the burners 22A–22K for the basic flow rate is calculated for each of the burners 22A–22K based on the deposition characteristic of each burner 22A–22K obtained from the calculated deposition ratio distribution (S16). The correction value of the flow rate of the raw material gas is calculated so that the deposition distribution of glass soot becomes uniform along the longitudinal direction of the starting base material 2. At a correction value calculation step (S16), a correction value is calculated so that the adjustment range becomes 50% or less of the basic flow rate. When the adjustment range exceeds 50% and when the amount of supply of the raw material gas is different between a certain burner and an adjoining burner, a defect may generated during sintering the glass base material.

Next, the second batch of the deposit is generated by supplying the raw material gas to the burners 22A–22K, respectively, and depositing glass soot on the starting base material 2 according to the value, which is obtained by correcting the correction value calculated in the correction value calculation step (S16), to the basic flow rate (S18). While depositing the second batch (S18), the basic flow rate may be changed according to the progress of time. However, while depositing the second batch (S18), the correction value of the flowrate of the raw material gas supplied to each burner is not changed with the time. That is, once the correction value is set to each flow rate regulators 74, 76, 78, 80, 82, 84, and 86, the correction value is not changed until the deposition of the second batch (S18) is completed.

Next, the second batch of the glass base material is generated by vitrifying the second deposit generated by the deposition of the second batch (S18) using a sintering apparatus (S20). Next, the diameter and the core diameter of the second batch of the glass base material are measured, and a deposition ratio distribution is calculated (S22).

Next, a correction value is calculated for each of the burners 22A–22K based on the ratio of the deposition ratio of the first batch of the glass base material corresponding to each position of the burners 22A–22K and the deposition ratio of the second batch of the glass base material corresponding to each position of the burners 22A–22K (S24). First, the rate of change of the deposition ratio of the first batch of the glass base material and the deposition ratio of the second batch of the glass base material in each position of the burners 22A–22K is calculated. The rate of change of the ratio of this deposition ratio shows the rate of change of the ratio between the deposit amount of glass soot in the first glass base material and the deposit amount of glass soot in the second glass base material in each position of the burners 22A–22K. The formula for calculating the rate of change of the ratio of the deposit amount of the glass soot is shown below.

Rate-of-change of a deposition ratio=(deposition ratio of second glass base material)/(deposition ratio of the first glass base material)

Next, the correction value of the flow rate of the raw material gas supplied to the burners 22A–22K is adjusted so that the deposition distribution of glass soot may become uniform along the longitudinal direction of the starting base material 2 based on the calculated rate of change of the deposition ratio.

Next, glass soot is deposited on the starting base material, and the third batch of the deposit is generated by supplying the raw material gas to the plurality of burners, respectively, based on the value, which is obtained by correcting the correction value calculated in the correction value calculation step (S24) to the basic flow rate (S26). Here, while depositing the third batch (S26), the basic flow rate maybe changed according to the progress of time. However, while depositing the third batch (S26), the correction value of the supply amount of the raw material gas to each burner does not change with time. That is, once the correction value is set for each flow rate regulators 74, 76, 78, 80, 82, 84, and 86, the correction value does not change until the completion of the third batch of the deposition (S26).

Next, the third batch of the glass base material is generated by vitrifying the third batch of the deposit manufactured by the third batch of the deposition (S26) using the sintering apparatus (S28). By repeating the deposit sintering process and the correction value calculation process explained in the third batch of the deposition (S26), the third batch of the vitrification (S28), and a correction value calculation step (S24) for a plurality of batches, the glass base material having a uniform deposition distribution of glass soot can be manufactured. Moreover, the deposition process, the sintering process, and the correction value calculation process explained in the processes of the second batch of deposition (S18), the second batch of vitrification (S20), and the correction value calculation (S16) may be repeated instead of repeating the deposition process, the sintering process, and the correction value calculation process explained in the third batch of the deposition (S26), the third batch of the vitrification (S28), and the correction value calculation step (S24).

As described above, the glass base material having a uniform deposition distribution of glass soot can be manufactured by assuming and adjusting the conditions, where the deposition distribution of glass soot becomes uniform along the longitudinal direction of the starting base material 2, when number of batches of the glass base materials is actually manufactured.

Example 1

The deposit 10 was manufactured using the glass base material manufacturing apparatus 200 shown in FIG. 4. However, the number of burners to be used was 10 instead of 11. The burner has been arranged with as interval of 150 mm. Therefore, the burners 22A–22J were used among the burners 22A–22K shown in FIG. 4. The deposit having an outside diameter of average of 180 mm was manufactured by depositing glass soot on the starting base material 2 having outside diameter of 40 mm.

The amount of gas supplied to each burner 22A–22J was changed according to the increase in the outside diameter of the deposit 10. For example, in the early stages of deposition, the gas supply amount was controlled so that the supply amount of H2 to be 50 Nl/min, the supply amount of O2 to be 30 Nl/min, and the supply amount of the raw material gas (SiCl4) to be 3.5 Nl/min. The gas supply amount was controlled so that the supply amount of H2 to be 100 Nl/min, the supply amount of O2 to be 50 Nl/min, and the supply amount of the raw material gas (SiCl4) to be 23 Nl/min at the end of deposition.

The moving speed of the burners 22A–22J is set so that the moving speed of the first moving mechanism 48 to be 1,000 mm/min and the moving speed of the second moving mechanism 50 to be 20 mm/min. Moreover, both the moving width of the first moving mechanism 48 and the second moving mechanism 50 was set to be 150 mm. The distance between the burners 22A–22J and the deposit 10 was set to be constant during the deposition of the glass soot on the starting base material 2.

Furthermore, the raw material gas of the same flow rate was supplied to all the burners 22A–22J by outputting the same signal to all the flow rate regulators 74–86 included in the gas flow control units 52A–52J.

Furthermore, the rotation speed of the starting base material 2 was controlled according to the increase in the outside diameter of the deposit 10. For example, the rotation speed was controlled so that the rotation speed to be 110 rpm at the time of starting the deposition and the rotation speed to be 30 rpm at the time of end of deposition.

Glass base material was manufactured by manufacturing the deposit 10 and vitrifying the deposit 10 based on the above-mentioned setting conditions.

Example 2

Figure 7:
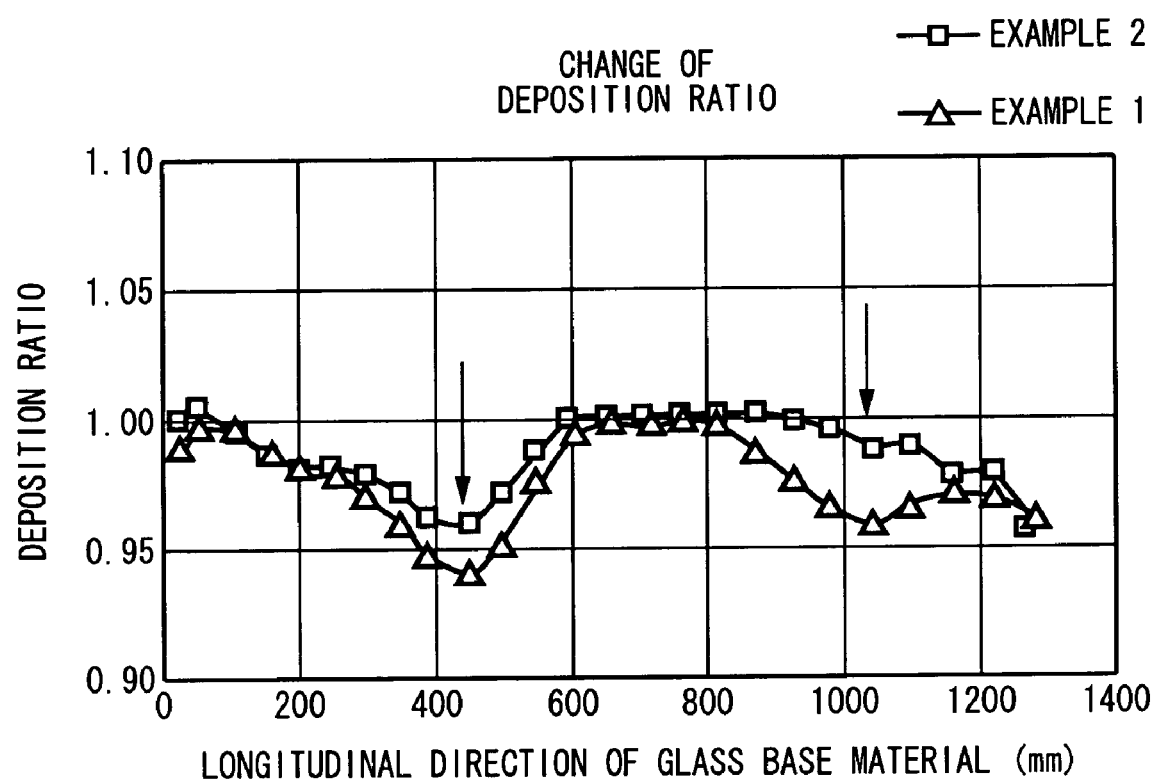
FIG. 7 shows the change of each deposition ratio of Example 1 and Example 2.

As a result of measuring the deposition ratio distribution of Example 1 using the preform analyzer 100, the deposition ratio at the positions corresponding to the third burner 22C and the seventh burner 22G from the left, which are indicated by two arrows as shown in FIG. 7, was lower than the deposition ratio of other positions. Thus, the supply conditions of the raw material gas over the burners 22C and 22G were adjusted as follows so that the deposition ratio distribution to be uniform a long the longitudinal direction of the glass base material.

That is, each flow rate regulators 74–86 were set, respectively, so that the flow rate of the third burner 22C and the seventh burner 22G from the left among the 10 burners of 22A–22J becomes 1.20 times and 1.10 times, respectively, of the flow rate of the other burners. This ratio of flow rate was kept constant during the deposition of the glass soot. The conditions other than the supply condition of the raw material gas to the burners 22C and 22G are set to be the same conditions with Example 1.

The deposit 10 having an average outside diameter of 180 mm was manufactured by depositing glass soot on the starting base material 2 having outside diameter of 40 mm based on the above-mentioned setting conditions. Furthermore, the glass base material was manufactured by vitrifying the manufactured deposit 10 into transparent glass.

Example 3

As a result of measuring the deposition ratio distribution of Example 2, the deposition ratio around the region at the positions corresponding to the third burner 22C and the seventh burner 22G from the left, which are indicated by two arrows as shown in FIG. 7 was lower than the deposition ratio of the other positions. Thus, the supply conditions of the raw material gas of the burners 22A–22J were adjusted as follows so that the deposition ratio distribution along the longitudinal direction of the glass base material becomes uniform.

That is, each flow rate regulators corresponding to each burners 22A–22J are adjusted so that the supply conditions of the burners 22A–22J are set such that the supply amount of the burner 22A is 1.04 times the basic flow amount, and the supply amount of the burner 22B is 1.04 times the basic flow amount, and the supply amount of the burner 22C is 1.08 times the basic supply amount, and the supply amount of burner 22D is 0.97 times the basic supply amount, and the supply amount of the burner 22E is 0.90 times the basic supply amount, and the supply amount of the burner 22F is 0.97 times the basic supply amount, and the supply amount of burner 22G is 1.18 times the basic supply amount, and the supply amount of the burner 22H is 1.00 times the basic supply amount, and the supply amount of the burner 22I is 0.93 times the basic supply amount, and the supply amount of the burner 22J is 0.90 times the basic supply amount where the basic supply amount is assumed to be 1. This flow rate ratio was kept constant during the deposition of the glass soot. All the conditions other than the supply condition of the raw material gas were set as the same conditions with Example 2.

The deposit 10 having an average outside diameter of 180 mm was manufactured by depositing glass soot on the starting base material 2 having an outside diameter of 40 mm based on the above-mentioned setting conditions. Furthermore, a glass base material was manufactured by vitrifying the manufactured deposit 10 into transparent glass.

FIG. 7 shows the change of each deposition ratio of Example 1 and Example 2. The line with square points in FIG. 7 shows the deposition ratio distribution, which is obtained by measuring the glass base material manufactured in Example 1 using the preform analyzer 100. On the other hand, the line with triangular points indicates the deposition ratio distribution, which is obtained by measuring the glass base material manufactured in Example 1 using the preform analyzer 100. The arrow in the figure corresponds to the position of the third and the seventh burners 22C and 22G from the left, respectively.

Since the deposition ratio in the range corresponding to the positions of the third burner 22C and the seventh burner 22G from the left shown by the arrow is low in Example 1 as shown in FIG. 7, the amount of deposition of glass soot is not uniform along the longitudinal direction of the glass base material.

Therefore, in Example 2, the supply amount of the raw material gas to the third burner 22C and the seventh burner 22G from the left was increased by adjusting the flow rate regulators 74C–86C and 74G–86G included in the gas flow control units 52C and 52G, respectively. Therefore, it can be understood that the deposition ratio of Example 2 increased compared with the deposition ratio of Example 1 when the deposition ratio is compared at the positions of the burners 22C and 22G shown by the arrow. That is, it can be understood that the amount of deposition of the glass soot of Example 2 increased compared with the amount of deposition of the glass soot of Example 1 in the range corresponding to the positions of the burners 22C and 22G. Since the amount of deposition of the glass soot of the burners 22C and 22G increased, the deposition ratio distribution of Example 2 became uniform in the longitudinal direction of the glass base material compared with the deposition ratio distribution of Example 1.

Figure 8:
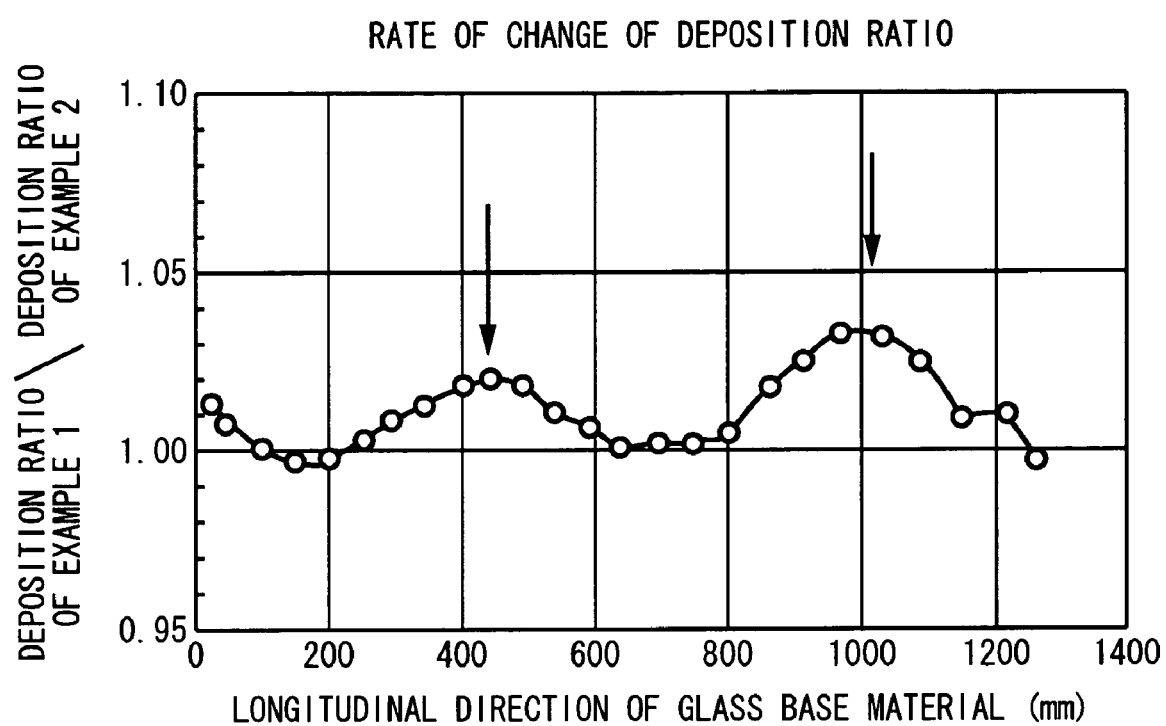
FIG. 8 shows the rate of change of the deposition ratio of Example 1 and the deposition ratio of Example 2.

FIG. 8 shows the rate of change of the deposition ratio of Example 1 and the deposition ratio of Example 2. That is, FIG. 8 shows the degree of partial increase of the deposition ratio of Example 2 over the deposition ratio of Example 1. In order to obtain the rate of change of the deposition ratio, the rate of change of the deposition ratio of Example 2 over the deposition ratio of Example 1 was obtained for each position of burners 22A–22J. As shown in FIG. 8, the rate of change at the part shown by the arrow that corresponds to the third burner 22C and the seventh burner 22G increased.

Figure 9:
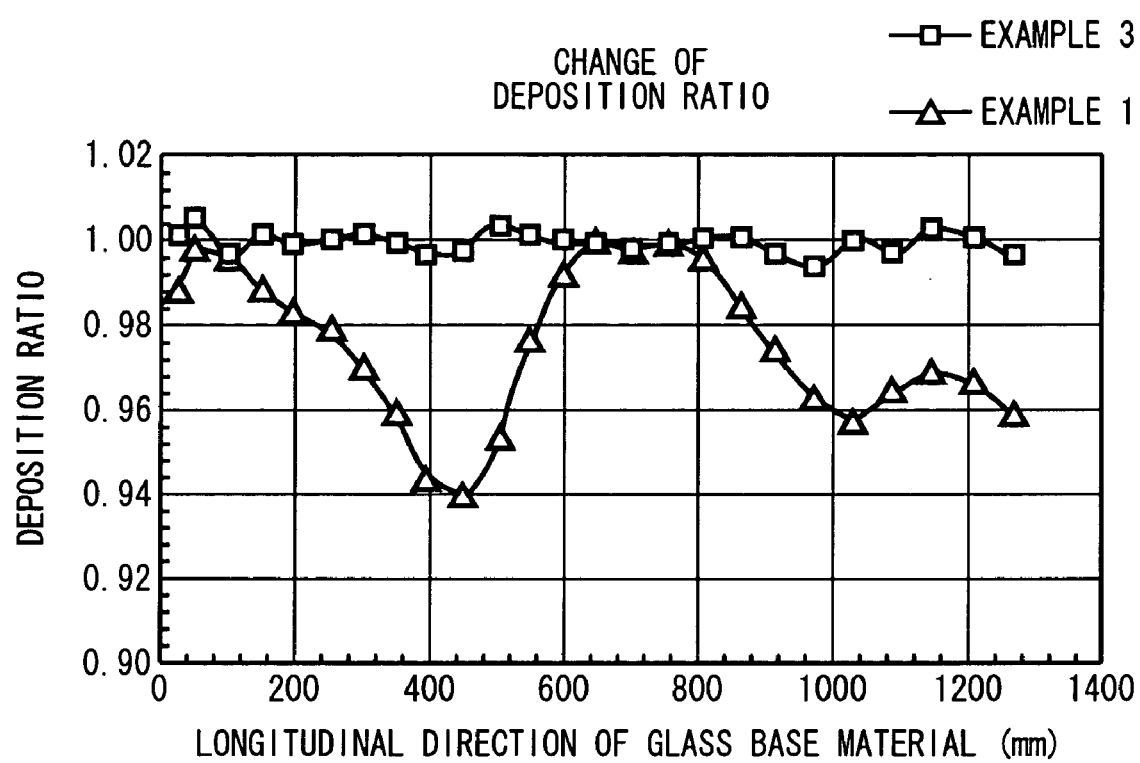
FIG. 9 shows the change of deposition ratio in Example 3 and Example 1.

FIG. 9 shows the change of deposition ratio in Example 3 and Example 1. The line with square points in FIG. 9 shows the deposition ratio distribution, which is obtained by measuring the glass base material manufactured in Example 3 using the preform analyzer 100. On the other hand, the line with triangular points shows the deposition ratio distribution, which is obtained by measuring the glass base material manufactured in Example 1 using the preform analyzer 100. The supply amount of the raw material gas to each burner 22A–22G was adjusted in Example 3 based on the result of Example 2. Therefore, as shown in FIG. 9, the deposition ratio distribution of Example 3 became substantially uniform along the longitudinal direction of the glass base material.

Figure 10:
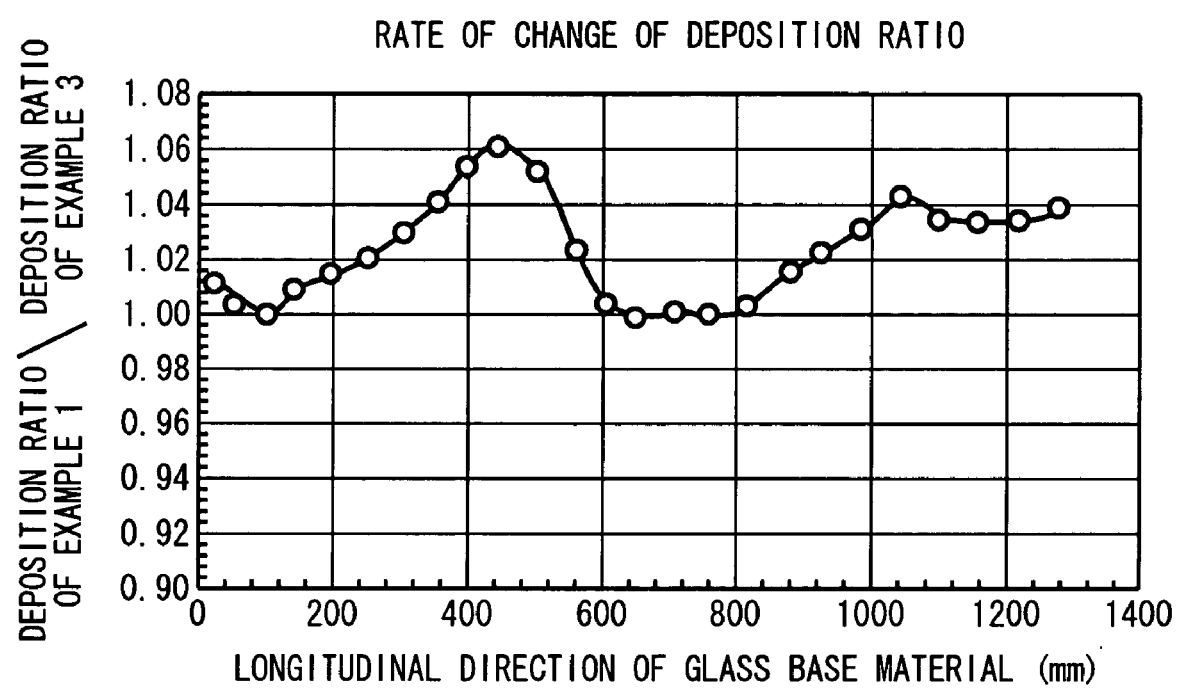
FIG. 10 shows the rate of change between the deposition ratio of Example 3 and the deposition ratio of Example 1.

FIG. 10 shows the rate of change between the deposition ratio of Example 3 and the deposition ratio of Example 1. That is, FIG. 10 shows the degree of partial increase of the deposition ratio of Example 3 over the deposition ratio of Example 1. In order to obtain the above-mentioned rate of change of the deposition ratio, the rate of change of the deposition ratio of Example 3 over the deposition ratio of Example 1 is obtained for each position of the burners 22A–22J. It is understood that the rate of change of each burner 22A–22J of Example 3 increased around the burner 22C and burner 22G as shown in FIG. 10.

Example 1 corresponds to manufacturing the first batch of the glass base material by the first batch of the deposition (S10) and the first batch of the vitrification (S12) if the above-explained Example 1, Example 2, and Example 3 refer to the flow chart of FIG. 6. Furthermore, Example 2 corresponds to manufacturing the second batch of the glass base material by the measurement of the outside diameter and the core diameter of the first batch of the glass base material (S14), the calculation of the correction value (S16), the deposition of the second batch (S18), and the vitrification of the second batch (S20). Furthermore, Example 3 corresponds to manufacturing the third batch of the glass base material by the measurement of the outside diameter and the core diameter of the third batch of the glass base material (S22), calculation of the correction value (S24), third batch of the deposition (S26), and vitrification of the third batch (S28).

Therefore, it can be understood that the deposition ratio distribution of glass soot becomes further uniform as shown in FIGS. 7 and 9 every time when the correction value is adjusted in Example 1, Example 2 and Example 3. Therefore, the lass base material having uniform deposition ratio distribution can be manufactured according to the embodiment shown from FIG. 4 to FIG. 6.

Figure 11A:
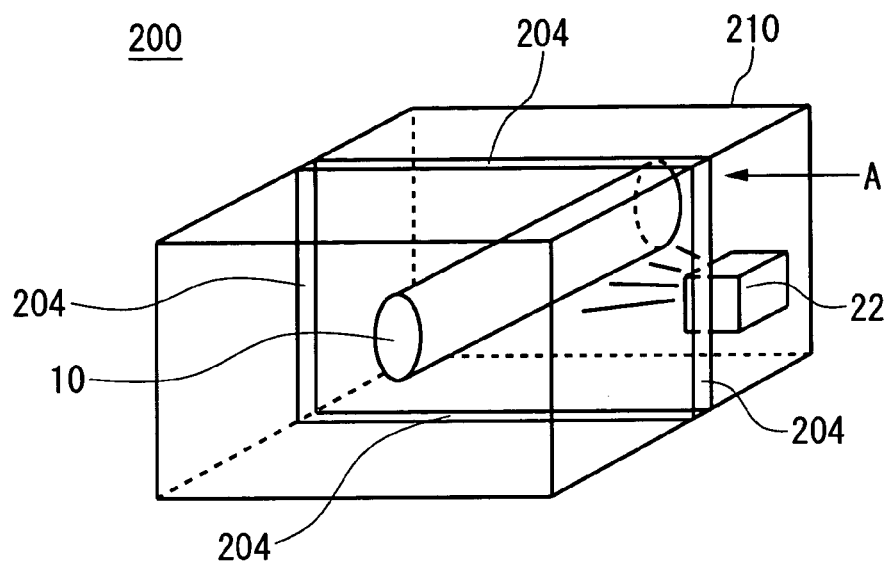
FIG. 11 shows an embodiment of the deformation reduction mechanism of the glass base material manufacturing apparatus 200.
Figure 11B:
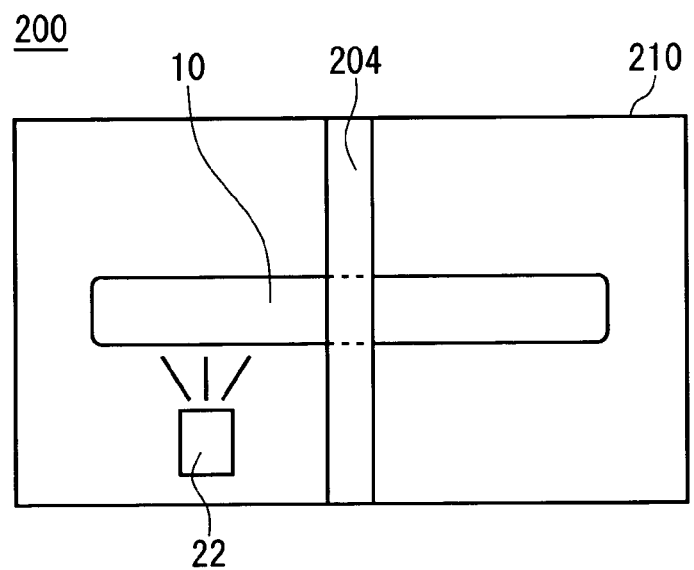
Figure 11C:
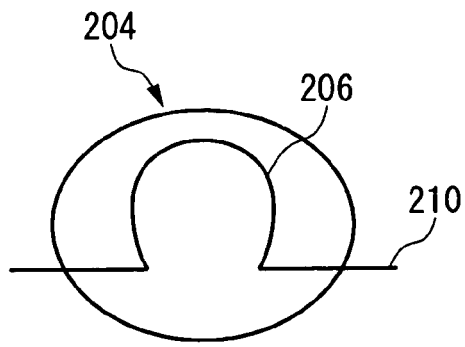

FIG. 11 shows an embodiment of the deformation reduction mechanism of the glass base material manufacturing apparatus 200. FIG. 11A shows a perspective view of the glass base material manufacturing apparatus 200. FIG. 11B shows a plane view of the glass base material manufacturing apparatus 200. FIG. 11C shows the sectional view that enlarges the flexural structure part 204 seen from the direction of the arrow A of FIG. 11A. The glass base material manufacturing apparatus 200 in FIG. 11 has the similar configuration with that of the glass base material manufacturing apparatus 200 shown in FIG. 4 except the configuration of the reaction vessel 210. Thus, the configurations other than the reaction vessel 210, the deposit 10, a burner 22, and a deformation reduction mechanism of the glass base material manufacturing apparatus 200 are abbreviated in order to simplify the explanation in FIG. 11. Moreover, in order to simplify the explanation, the configuration of the burner 22 is simplified.

If the deposit 10 is manufactured using the glass base material manufacturing apparatus 200, the temperature inside of the glass base material manufacturing apparatus 200 increases due to the heat generated when the burner 22 generates glass soot. For example, the temperature inside the apparatus reaches hundred degrees during the deposition of the glass soot, and the temperature inside the apparatus returns to room temperature after the deposition of the glass soot. Deformation or cracks caused by the heat stress may occur on parts that form the apparatus, especially the reaction vessel 210, by the repetition of the rapid rise and fall of the temperature in the apparatus, i.e., heat cycle. Therefore, not only the heat cycle has bad influence on the characteristic of the manufactured deposit 10, but also it may become impossible to work the glass base material manufacturing apparatus 200 because of the damage to the reaction vessel 210.

Thus, by providing a deformation reduction mechanism on the reaction vessel 210, the deformation reduction mechanism can prevent the deformation or damage to the apparatus since the deformation reduction mechanism absorbs, distributes, or suppresses the heat stress in the reaction vessel 210.

Figure 1:
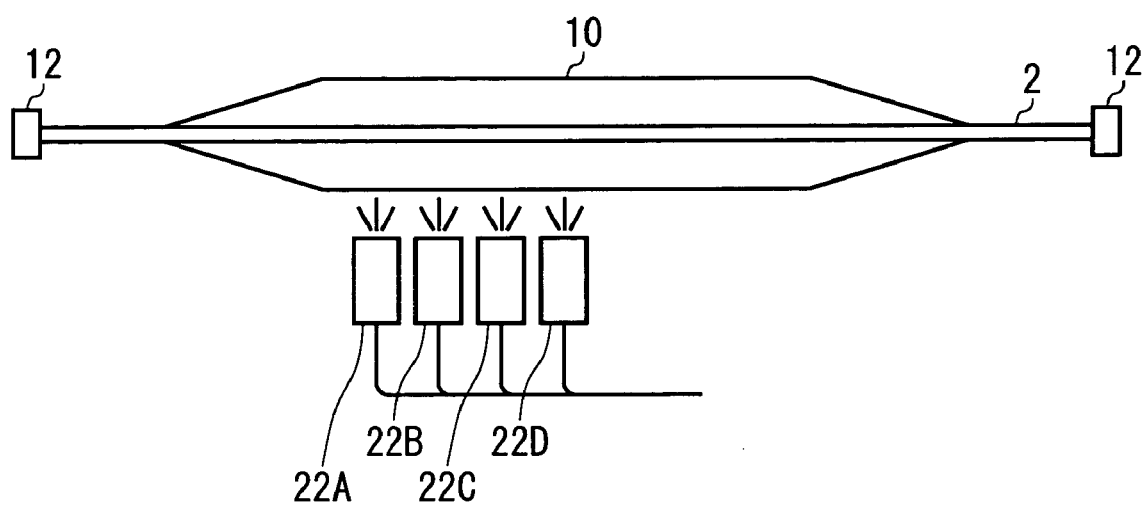
FIG. 1 shows the configuration of a conventional glass base material manufacturing apparatus.
Figure 2:
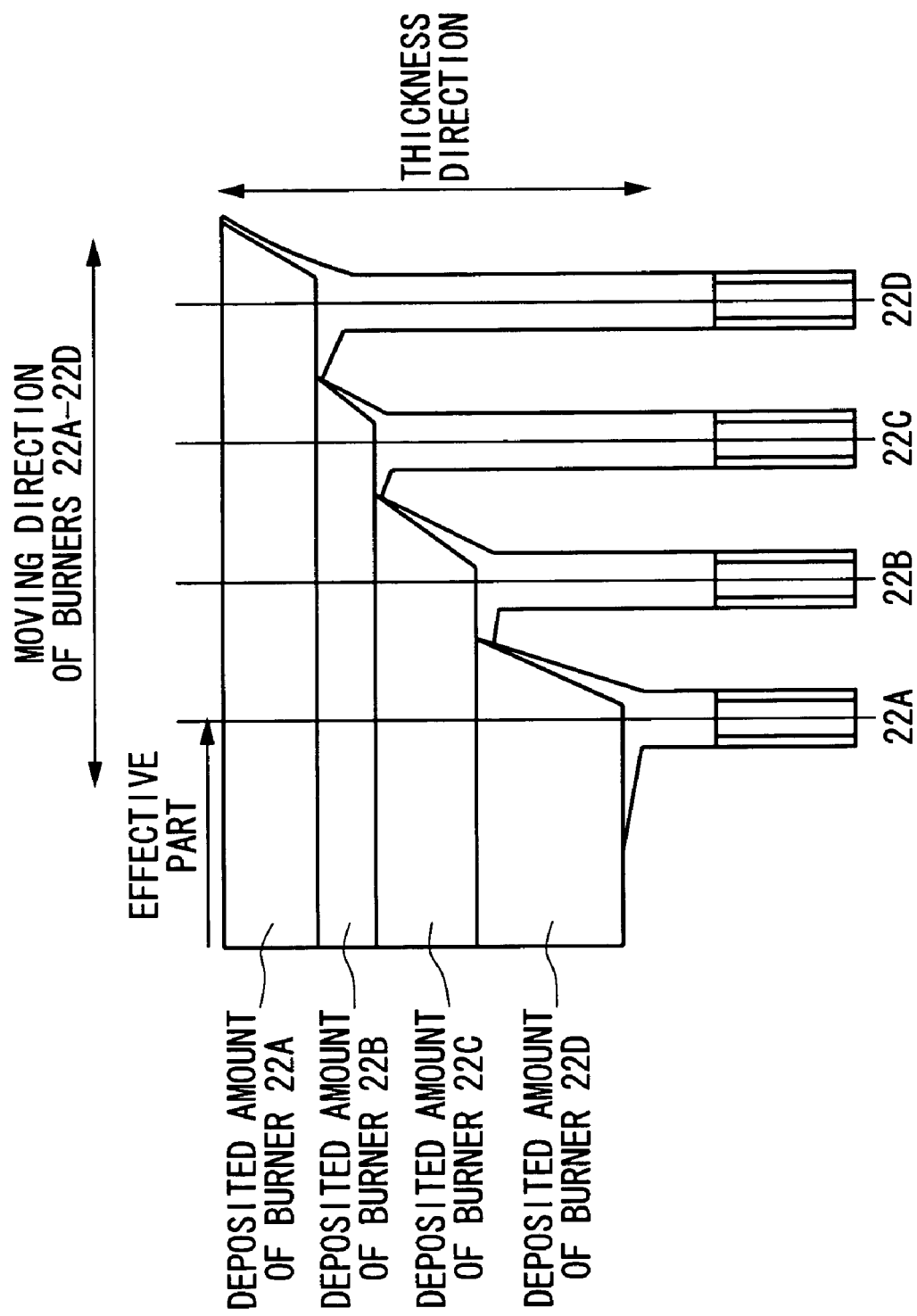
FIG. 2 shows a deposit amount of the glass soot by the burners 22A–22D according to a full-range traverse method.
Figure 3:
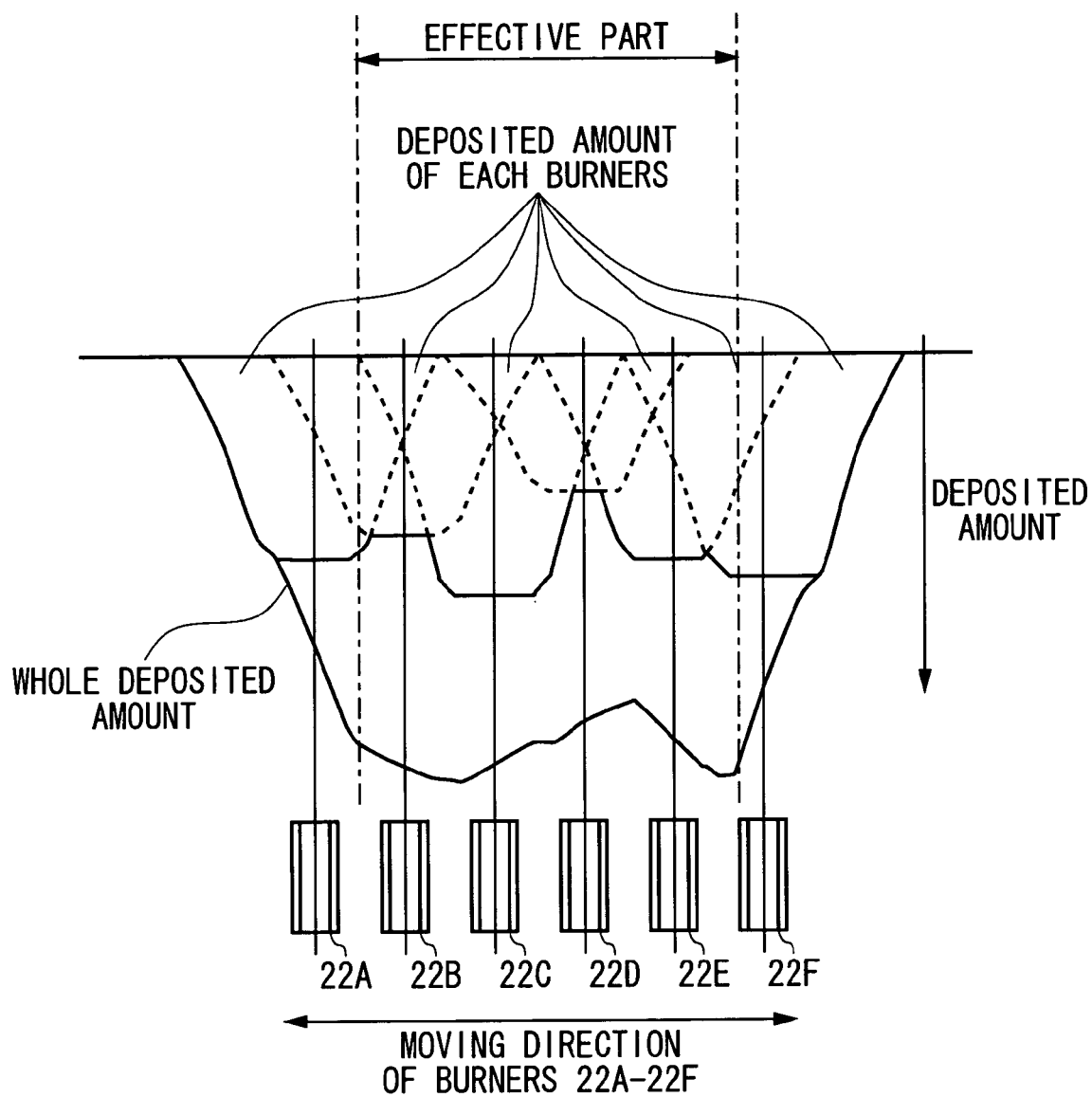
FIG. 3 shows a deposited amount of the glass soot by the burners 22A–22F according to the partial traverse method.

The deformation reduction mechanism shown in FIG. 11 includes a flexural structure part 204, which is formed in the reaction vessel 210. As shown in FIG. 1C, the section of the flexural structure part 204 has a flexural structure such that the section expands outside from the surface of a wall of a reaction vessel. Furthermore, the flexural structure part 204 is formed around the reaction vessel 210 so that the flexural structure part 204 surrounds the reaction vessel 210. That is, the section of the reaction vessel 210 is halved at the flexural structure part 204 as a border. Furthermore, the section of the reaction vessel 204 may be divided into a plurality parts by forming the flexural structure part 204 in the plurality of places of the reaction vessel 204. The flexural structure part 204 can prevent the deformation or damage on an apparatus by absorbing the expansion caused by the heat inside the reaction vessel 210.

The flexural structure part 204 is formed by the same material with the material of the reaction vessel 210. For example, it is preferable to use nickel material (Ni) as a material used for the flexural structure part 204. Moreover, stainless steel material may be used for the flexural structure part 204. Furthermore, the flexural structure part 204 may be formed by the material, which is different from the material of the reaction vessel 210.

Figure 12A:
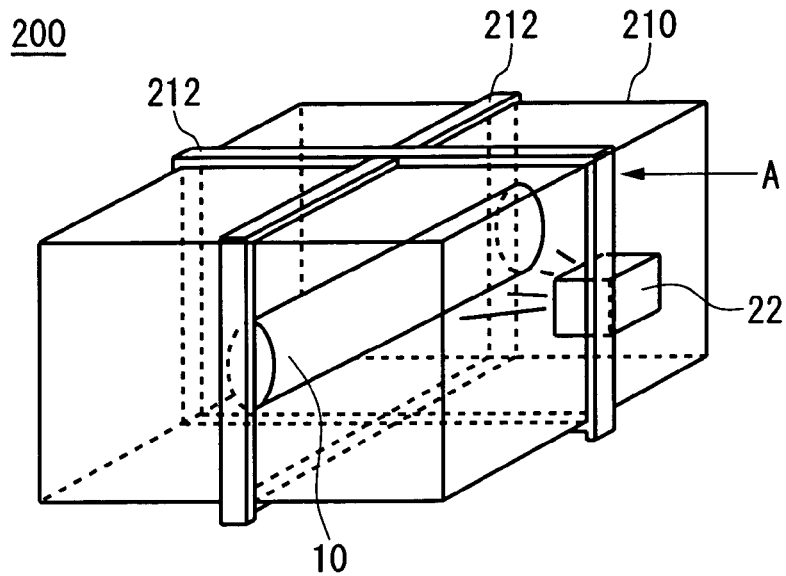
FIG. 12 shows other embodiments of a deformation reduction mechanism.
Figure 12B:
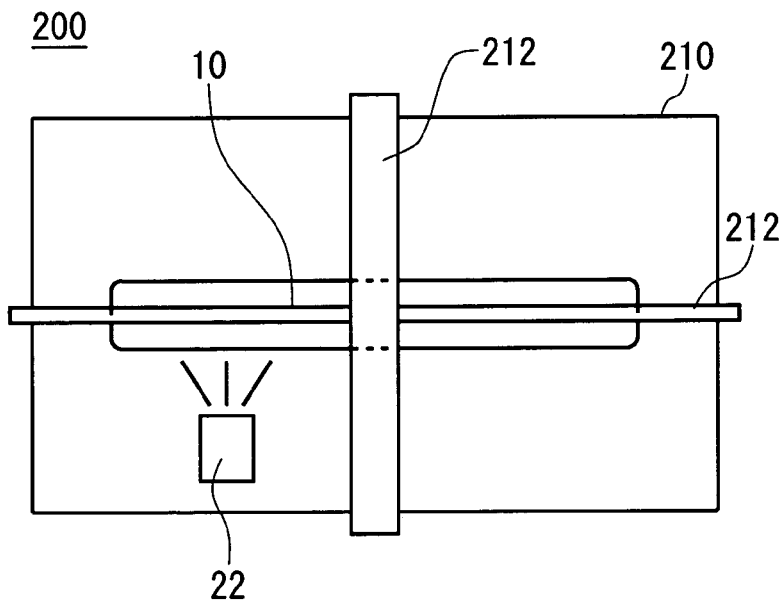
Figure 12C:
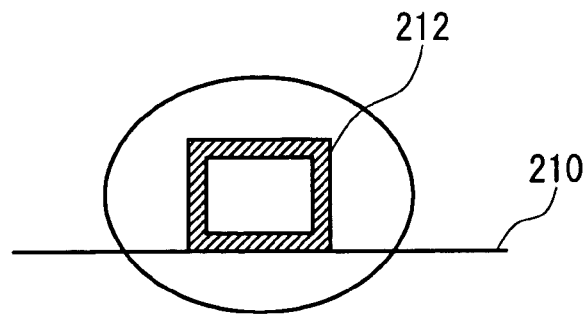

FIG. 12 shows other embodiments of a deformation reduction mechanism. FIG. 12A shows a perspective view of the glass base material manufacturing apparatus 200. FIG. 12B shows the plan view of the glass base material manufacturing apparatus 200. FIG. 12C shows the expanded sectional view of the deformation restriction unit 212 seen from the direction of the arrow A in FIG. 12A.

The glass base material manufacturing apparatus 200 of FIG. 12 has a configuration similar to the glass base material manufacturing apparatus 200 shown in FIG. 4 except the reaction vessel 210. Thus, the configuration other than the reaction vessel 210, the deposit 10, the burner 22, and the deformation reduction mechanism of the glass base material manufacturing apparatus 200 is abbreviated in FIG. 12 in order to simplify the explanation. Moreover, in order to simplify the explanation, the configuration of the burner 22 shown in the figure is simplified.

The deformation reduction mechanism shown in FIG. 12 has a deformation restriction unit 212, which restricts the deformation of the reaction vessel 210. As shown in FIG. 12C, the square shaped hollow steel pipe is used for the deformation restriction unit 212. Moreover, as long as it can restrict the deformation of the reaction vessel 210, the members, such as channel or H-beam other than a square shape steel pipe may be used as a deformation restriction unit 212.

Two deformation restriction units 212 are formed so that each of the deformation restriction units 212 surrounds the circumference of the reaction vessel 210 and restricts the deformation of the reaction vessel 210. The deformation caused by the heat stress of the reaction vessel 210 is restricted in the upper and lower direction, right and left direction, and back and forth direction by providing two deformation restriction units 212 that surround the circumference of the reaction vessel 210 in the direction orthogonal with each other. The deformation restriction unit 212 suppresses the reaction vessel 210 so that the heat stress, which is generated by the heat cycle inside the reaction vessel 210, does not damage and deform the reaction vessel 210.

Carbon steel or stainless steel is used as a material of the deformation restriction unit 212. Materials other than carbon steel or stainless steel having a low linear expansivity such as from $1.2 \times 10^{-5}/°C$. to $1.8 \times 10^{-5}/°C$. may be used for the deformation restriction unit 212.

Figure 13A:
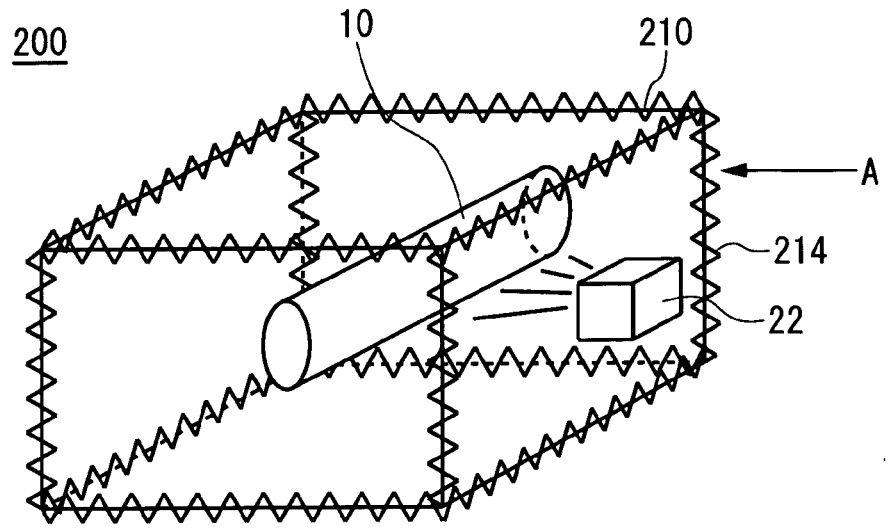
FIG. 13 shows another embodiment of a deformation reduction mechanism.
Figure 13B:
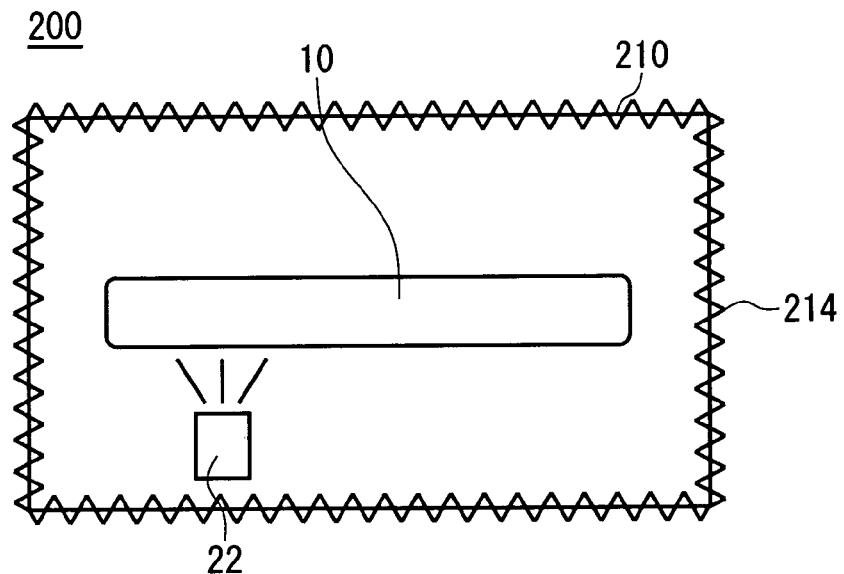
Figure 13C:
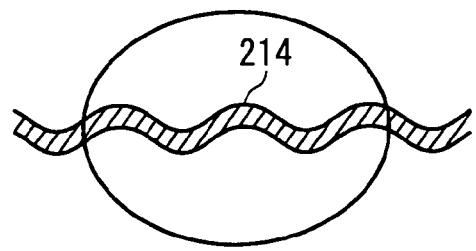

FIG. 13 shows other embodiments of a deformation reduction mechanism. FIG. 13A shows a perspective view of the glass base material manufacturing apparatus 200. FIG. 13B shows a plan view of the glass base material manufacturing apparatus 200. FIG. 13C shows an expanded sectional view of the curved wall 214 seen from the direction of the arrow A in FIG. 13A.

The glass base material manufacturing apparatus 200 of FIG. 13 has the similar configuration with the glass base material manufacturing apparatus 200 shown in FIG. 4 except the reaction vessel 210. Thus, the configurations other than the reaction vessel 210, the deposit 10, the burner 22, and the deformation reduction mechanism of the glass base material manufacturing apparatus 200 are abbreviated in FIG. 13 in order to simplify the explanation. Moreover, in order to simplify explanation, the configuration of the burner 22 is simplified and shown in the FIG. 13.

The reaction vessel 210 has the curved wall 214, which has a continuously curved form as the deformation reduction mechanism. As shown in FIG. 13C, the curved wall 214 is formed by a large number of continuous flexural surface. Because the reaction vessel 210 has the curved wall 214, the heat stress generated by the heat cycle in the reaction vessel 210 is distributed in each curved surface part of the curved surface structure and does not concentrate on one point. Therefore, the curved wall 214 can suppress the damage and deformation of a reaction vessel caused by the heat stress.

Figure 14A:
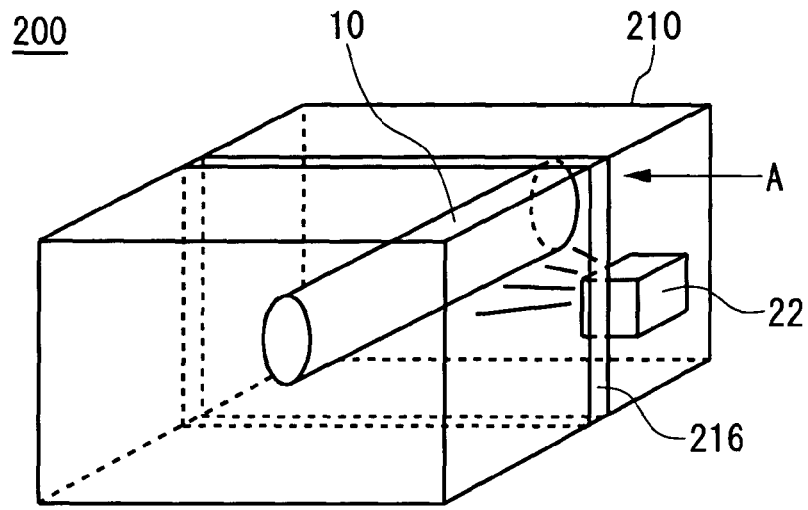
FIG. 14 shows other embodiments of a deformation reduction mechanism.
Figure 14B:
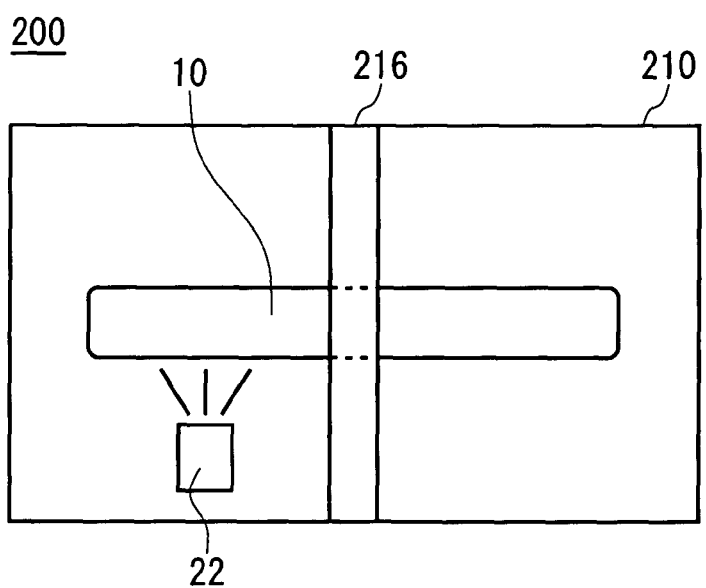
Figure 14C:
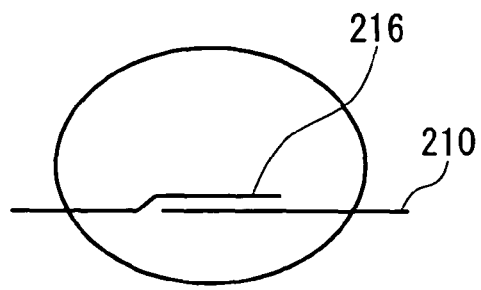

FIG. 14 shows other embodiments of a deformation reduction mechanism. FIG. 14A shows a perspective view of the glass base material manufacturing apparatus 200. FIG. 14B shows a plan view of the glass base material manufacturing apparatus 200. FIG. 14C shows an expanded sectional view of the slide part 216 seen from the direction of the arrow A of FIG. 14A. The glass base material manufacturing apparatus 200 of FIG. 14 has the similar configuration with the glass base material manufacturing apparatus 200 shown in FIG. 4 except the reaction vessel 210. Thus, the configurations other than the reaction vessel 210, the deposit 10, the burner 22, and the deformation reduction mechanism of the glass base material manufacturing apparatus 200 is abbreviated in FIG. 14 in order to simplify the explanation. Moreover, in order to simplify the explanation, the configuration of the burner 22 is simplified and shown in the FIG. 14.

The reaction vessel 210 has a slide part 216, in which a part of the walls of the reaction vessel 210 overlaps and slides, as the deformation reduction mechanism. The reaction vessel 210 has the slide part 216 around the reaction vessel 210 so that the slide part 216 surrounds the reaction vessel 210. Since a part of the walls of the reaction vessel 210 overlaps and slides by the slide part 216, the heat stress generated by the heat cycle in a reaction vessel is distributed by the sliding and is not accumulated. Therefore, the damage and the deformation of the reaction vessel 210 are suppressed.

Example 1

The deposit 10 was manufactured using the glass base material manufacturing apparatus 200, which has the flexural structure part 204 as shown in FIG. 11. The starting base material 2 having a length of 500 mm and an outside diameter of 25 mm manufactured using the VAD method was prepared. The starting base material 2 was held by the chuck 12. The raw material gas, fuel gas, and assist combustion gas of 10 L/minute of $SiCl_4$, 100 L/minute of $O_2$, and 200 L/minute of $H_2$ were supplied to the burners 22A–22K. The glass soot was deposited on the starting base material 2 while the starting base material 2 was rotated with the speed of 10 times/minute, and the burners 22A–22K were moved reciprocatory with a speed of 50 mm/minute along the longitudinal direction of the starting base material 2. The deposit 10 having an outside diameter of 150 mm was obtained by the above-mentioned process of depositing the glass soot.

While depositing the glass soot on the starting base material 2, the temperature inside the reaction vessel 210 was changed within a range between 80° C. and 310° C., and the temperature inside the reaction vessel 210 decreased to 30° C. at the end of the deposition. This deposition process was repeated for 100 times. The deformation of the reaction vessel 210 caused by the heat stress inside the reaction vessel 210 was suppressed to 1 mm. The crack caused by the heat stress was not generated in the reaction vessel 210. Moreover, no impure particles were mixed in the manufactured deposit 10, which was accompanied by the damage and the crack of the reaction vessel 210. Therefore, there was also no pore shaped defect caused by the mixing of impure particles into the manufactured deposit 10.

Example 2

The deposit 10 was manufactured using the glass base material manufacturing apparatus 200, which has the deformation restriction unit 212 as shown in FIG. 12. The deposit 10 having an outside diameter of 150 mm was manufactured according to the same conditions as Example 4 except the glass base material manufacturing apparatus 200 having the deformation restriction unit 212 as a deformation reduction mechanism.

While depositing the glass soot on the starting base material 2, the temperature in the reaction vessel 210 changed within a range between 80° C. to 310° C., and the temperature in the reaction vessel 210 decrease to 30° C. at the end of the deposition. This deposition process was repeated for 120 times. The deformation of the reaction vessel 210 caused by the heat stress inside the reaction vessel 210 was suppressed to 1 mm. The crack caused by the heat stress was not generated in the reaction vessel 210. Moreover, no impure particles were mixed in the manufactured deposit 10, which was accompanied by the damage and the crack of the reaction vessel 210. Therefore, there was also no pore shaped defect caused by the mixing of impure particles into the manufactured deposit 10.

Example 3

The deposit 10 was manufactured using the glass base material manufacturing apparatus 200, which has the curved wall 214 as shown in FIG. 13. The deposit 10 having an outside diameter of 150 mm was manufactured according to the same conditions as Example 4 except the glass base material manufacturing apparatus 200 having the curved wall 214 as a deformation reduction mechanism.

While depositing the glass soot on the starting base material 2, the temperature in the reaction vessel 210 changed within a range between 80° C. to 310° C., and the temperature in the reaction vessel 210 decreased to 30° C. at the end of the deposition. This deposition process was repeated for 120 times. The deformation of the reaction vessel 210 caused by the heat stress inside the reaction vessel 210 which was suppressed to 1 mm. The crack caused by the heat stress was not generated in the reaction vessel 210. Moreover, no impure particles were mixed in the manufactured deposit 10, which was accompanied by the damage and the crack of the reaction vessel 210. Therefore, there was also no pore shaped defect caused by the mixing of impure particles into the manufactured deposit 10.

Example 4

The deposit 10 was manufactured using the glass base material manufacturing apparatus 200, which has the slide part 216 as shown in FIG. 14. The deposit 10 having an outside diameter of 150 mm was manufactured according to the same conditions as Example 4 except the glass base material manufacturing apparatus 200 having the slide part 216 as a deformation reduction mechanism.

While depositing the glass soot on the starting base material 2, the temperature in the reaction vessel 210 changed within a range between 80° C. to 310° C., and the temperature in the reaction vessel 210 decreased to 30° C. at the end of the deposition. This deposition process was repeated for 130 times. The deformation of the reaction vessel 210 caused by the heat stress inside the reaction vessel 210 which was suppressed to 1 mm. The crack caused by the heat stress was not generated in the reaction vessel 210. Moreover, no impure particles were mixed in the manufactured deposit 10, which was accompanied by the damage and the crack of the reaction vessel 210. Therefore, there was also no pore shaped defect caused by the mixing of impure particles into the manufactured deposit 10.

Example 5

The deposit 10 was manufactured using the glass base material manufacturing apparatus 200, which has the curved wall 214 as shown in FIG. 13. The deposit 10 having an outside diameter of 150 mm was manufactured according to the same conditions as Example 4 except the glass base material manufacturing apparatus 200 having the curved wall 214 as a deformation reduction mechanism.

While depositing the glass soot on the starting base material 2, the temperature in the reaction vessel 210 changed within a range between 80° C. to 310° C., and the temperature in the reaction vessel 210 decreased to 30° C. at the end of the deposition. This deposition process was repeated for 170 times. The deformation of the reaction vessel 210 caused by the heat stress inside the reaction vessel 210 which was suppressed to 1 mm. The crack caused by the heat stress was not generated in the reaction vessel 210. Moreover, no impure particles were mixed in the manufactured deposit 10, which was accompanied by the damage and the crack of the reaction vessel 210. Therefore, there was also no pore shaped defect caused by the mixing of impure particles into the manufactured deposit 10.

Comparative Example 1

The deposit 10 was manufactured using the conventional glass base material manufacturing apparatus which does not have the deformation reduction mechanism shown from FIG. 11 to FIG. 14. The deposit 10 having an outside diameter of 150 mm was manufactured according to the same conditions as Example 4 except that the glass base material manufacturing apparatus 200 did not have the curved wall 214 as a deformation reduction mechanism.

While depositing the glass soot on the starting base material 2, the temperature in the reaction vessel 210 changed within a range between 80° C. to 310° C., and the temperature in the reaction vessel 210 decreased to 30° C. at the end of the deposition. This deposition process was repeated for 40 times. The deformation of the reaction vessel 210 caused by the heat stress inside the reaction vessel 210 reached to 25 mm. The crack caused by the heat stress was generated in five places in the reaction vessel 210. Moreover, many pore shaped defects, which were caused by mixing of impure particles into the manufactured deposit 10 accompanied by the damage and the crack of the reaction vessel 210, were generated in the manufactured deposit 10. Therefore, the manufactured deposit 10 could not be used as a product.

As explained above, the deformation, crack, and damage of the reaction vessel 210 caused by the heat stress can be decreased by providing the deformation reduction mechanism in the reaction vessel 210. Therefore, the deformation reduction mechanism can prevent the impure particles from being mixed in a deposit that produces a pore shaped defect, which is caused by the deformation, crack, and damage of the reaction vessel 210. Moreover, since the deformation reduction mechanism can extend the interval of repair or renewal of the glass base material manufacturing apparatus 200, a high quality glass base material can be manufactured at low cost.

Figure 15:
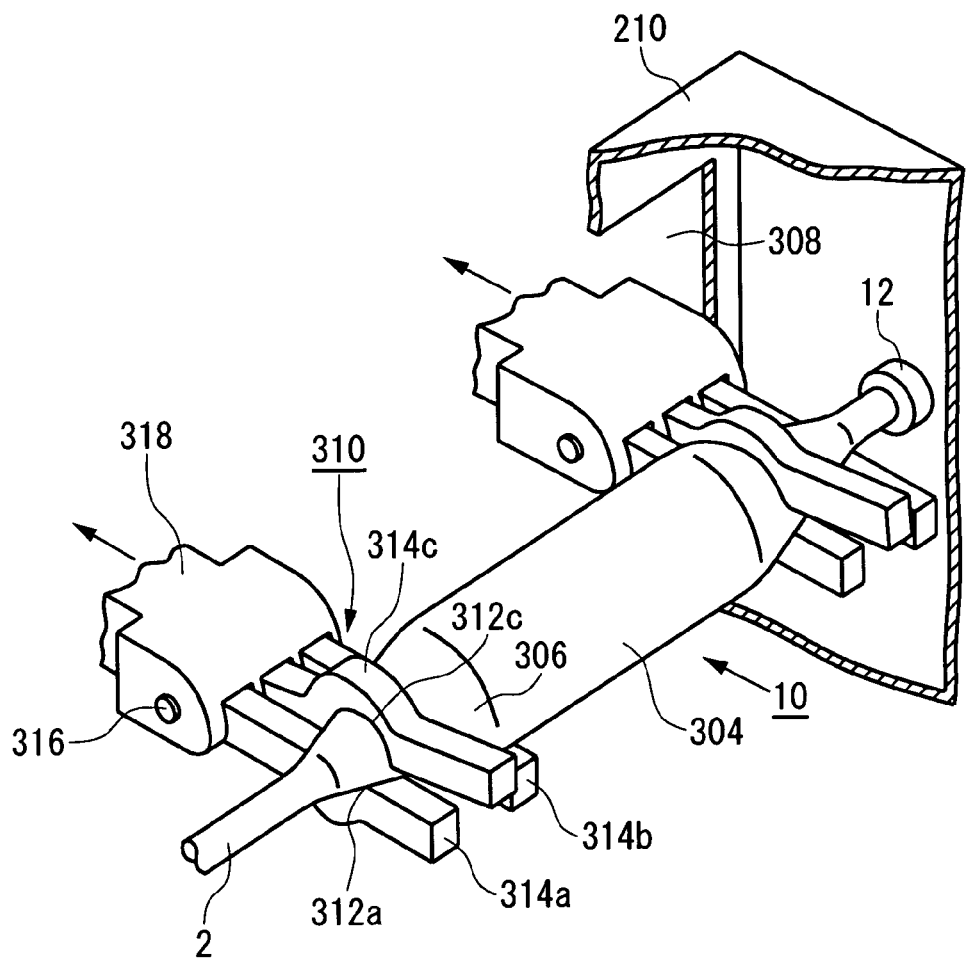
FIG. 15 shows a perspective view of a first embodiment of the holding unit of the glass base material manufacturing apparatus 200.
Figure 16:
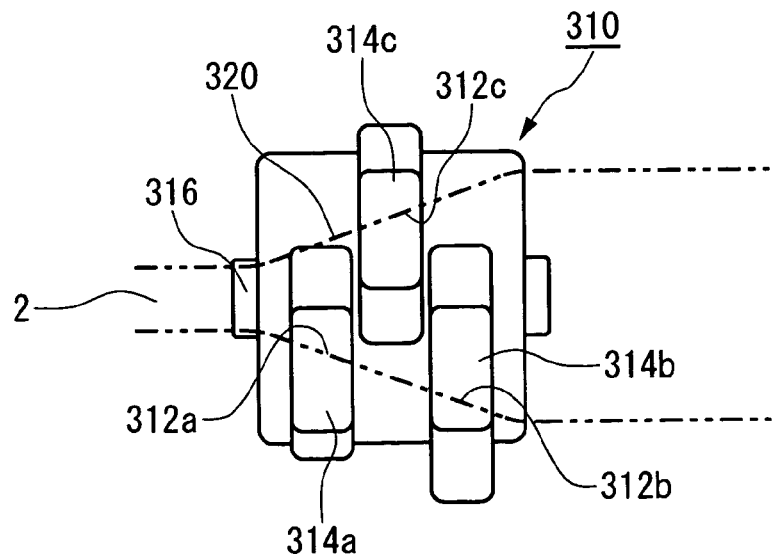
FIG. 16 shows a part of a plan view of the holding unit 310 shown in FIG. 15.

FIG. 15 shows a perspective view of a first embodiment of the holding unit of the glass base material manufacturing apparatus 200. FIG. 16 shows a part of a plan view of the holding unit 310 shown in FIG. 15. The glass base material manufacturing apparatus 200 has a holding unit 310, by which the deposit 10 is held and transported outside the reaction vessel 210. The deposit 10 has conical parts 306 both ends, and the holding unit 310 has a means for holding a conical part 306.

For example, the holding unit 310 has three clamps 314a–314c, which can hold the conical part 306 by sandwiching the conical part 306 from both the upper and lower sides in the embodiment shown in FIG. 15. The clamps 314a–314c can hold the conical part 306 from the upper and lower sides by rotating the clamps 314a–314c around the axis 316, which couples the clamps 314a–314c with each other. For example, the clamp 312c presses the conical part 306 downwards, and the clamps 312a and 312b press the conical part 306 upwards.

Furthermore, the clamps 314a–314c are installed at the tip of the arm 318, which has an axis 316. By moving the arm 318 horizontally, the clamps 314a–314c, which hold the deposit 10, can be moved horizontally. Therefore, the deposit 10 can be transported outside the reaction vessel 210.

Furthermore, the clamps 314a–314c have concave parts 312a–312c, which have the angle substantially similar to the angle of a part of the inclination 320 of the conical part 306 shown in FIG. 16. The concave part 312a–312c may have curved grooves as shown in FIG. 15. Moreover, the concave part 312a–312c may have substantially V-shaped grooves. Since the clamps 314a–314c have concave parts 312a–312c, the clamps 314a–314c can hold the conical part 306 securely.

Because the holding unit 310 has a means for holding the conical part 306, it can prevent damage and breakage of the deposit 10 when the deposit 10 is held and transported using the holding unit 310.

For example, the conventional holding unit holds both ends of the starting base material 2 when transporting the deposit 10. When the starting base material 2 having a small outside diameter was held and raised, a crack occurred in the starting base material 2, and the deposit 10 fell and broke due to the weight of a deposit.

On the other hand, if the cylindrical part 304 of the deposit 10 having a large outside diameter and strength is held by the holding unit, the pores inside the deposit 10 may collapse, or the surface of the deposit 10 may be damaged. The damage on the surface and the collapsed pores remain inside the glass base material, which is formed by vitrifying the deposit, as uneven parts or bubbles. Since these uneven parts or the bubbles remaining in the glass base material need to be removed, the yield rate of the manufacturing of the glass base material manufacture decreased due to the process of removing the uneven parts or bubbles.

Thus, the holding unit 310 of the present embodiment has a means for holding the conical part 306 of the deposit 10. The holding unit 310 can transport the deposit 10 without damaging the cylindrical part 304 of the deposit 10 by holding the conical part 306 of the deposit 10. Furthermore, since the outside diameter of the conical part 306 is larger than that of the starting base material 2, and the strength the conical part 306 is larger than that of the starting base material 2, the holding unit 310 can prevent the fall and breakage of the deposit 10, which is caused by a crack generated in the starting base material 2, by holding the conical part 306.

Figure 17:
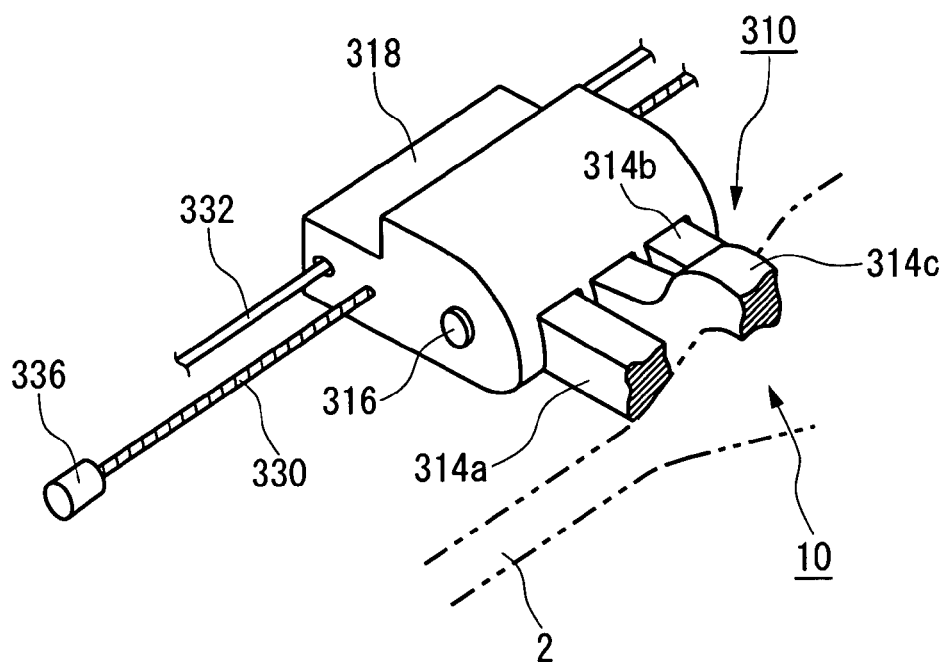
FIG. 17 shows another embodiment of the holding unit 310.

FIG. 17 shows other embodiments of the holding unit 310. In addition to the configuration of the holding unit 310 of FIG. 15, the holding unit 310 has a mechanism for adjusting the position of the clamps 314a–314c in the axial direction of the deposit 10.

The mechanism for adjusting the position of the clamps 314a–314c has an arm 318, which supports the clamps 314a–314c, and screw shaft 330, which moves the arm 318 in the axial direction of the deposit 10. The screw shaft 330 penetrates through the arm 318 and engages with the arm 318. The screw shaft 330 is connected to the electric motor 336. The arm 318 can be moved in the axial direction of the deposit 10 by rotating the screw shaft 330 using the electric motor 336. Furthermore, the position adjustment mechanism has a guide axis 332, which penetrates through the arm 318 in parallel with the screw shaft 330.

By the above-mentioned configuration of FIG. 17, the holding unit 310 can hold the conical part 306 at a suitable position by rotating the screw shaft 330 using the electric motor 336 according to the length of the deposit 10 and moving the arm 318 in the axial direction of the deposit 10.

Figure 18:
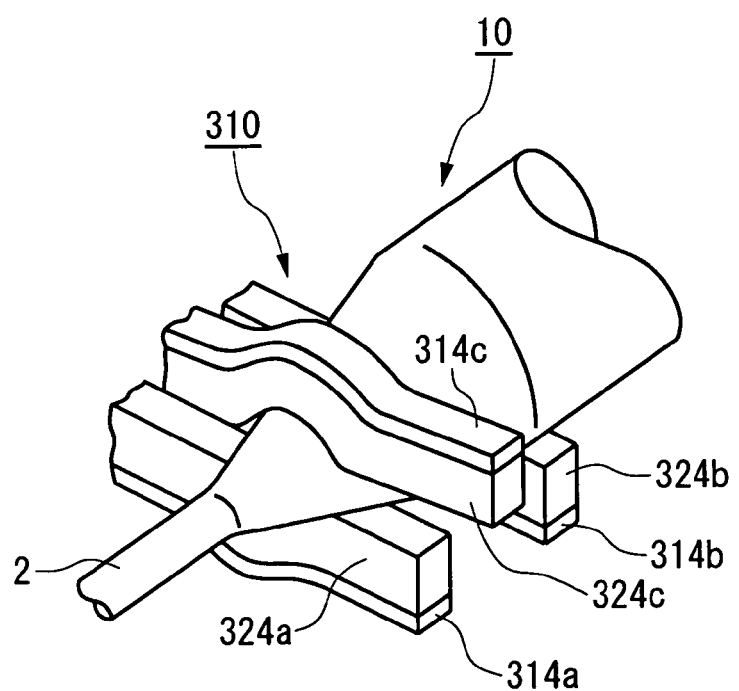
FIG. 18 shows other further embodiments of the holding unit 310.

FIG. 18 shows further other embodiments of the holding unit 310. In addition to the configuration of the holding unit 310 shown in FIG. 15, the holding unit 310 has a holding pressure adjustment unit for holding the conical part 306 with a substantially uniform pressure. For example, the holding pressure adjustment units are the elastic bodies 324a–324c formed on the face that contact with the conical part 306 of the clamps 314a–314c in FIG. 18. By forming the elastic bodies 324a–324c on the face that contact with the conical part 306 of the clamps 314a–314c, the holding unit 310 can hold the conical part 306 securely even if the conical part 306 has uneven parts.

Figure 19:
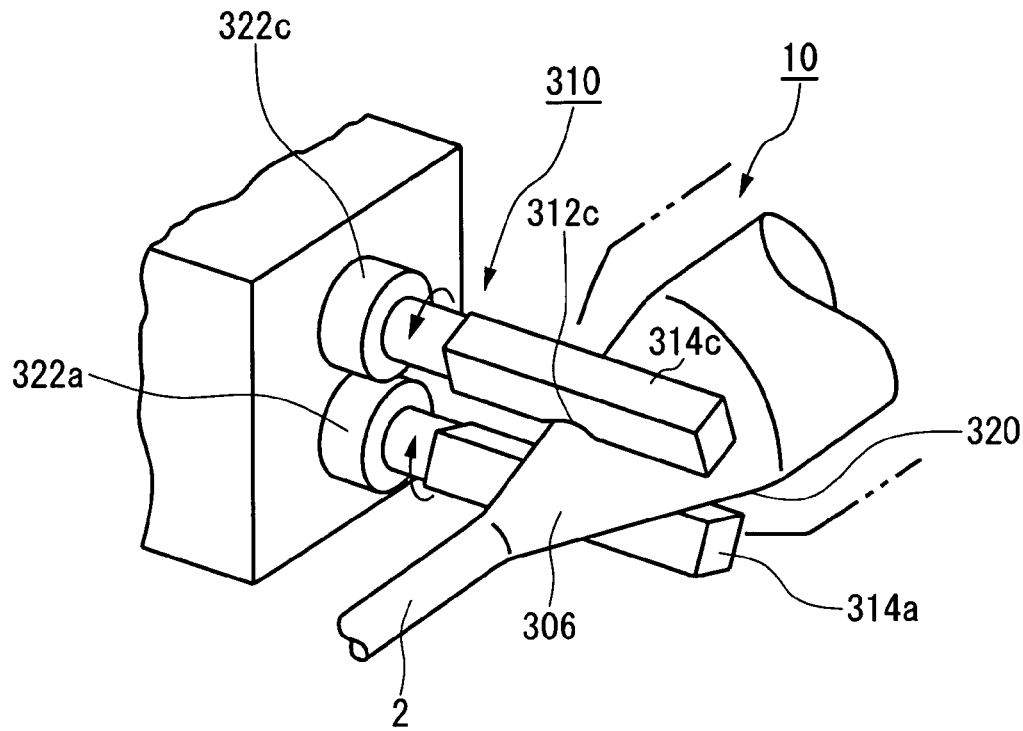
FIG. 19 shows other further embodiments of the holding unit 310.

FIG. 19 shows further other embodiments of the holding unit 310. The holding unit 310 has clamps 314a and 314c, which can hold the conical part 306 by sandwiching the conical part 306. The clamps 314a and 314c have concave part 312a (not shown in the figure) and 312c. Furthermore, the holding unit 310 has holding angle adjustment units 322a and 322c for adjusting the angle of the concave part 312a and 312c of the clamps 314a and 314c to be substantially same with the angle of a part of the inclination 320 of the conical part 306.

The holding angle adjustment units 322a and 322c rotate the clamps 314a and 314c around the longitudinal direction of the clamps 314a and 314c as an axis. The holding angle adjustment units 322a and 322c adjust the angle of the concave parts 312a and 312c of the clamps 314a and 314c to be substantially same with the angle of the inclination 320 of a part of the conical part 306 by rotating the clamps 314a and 314c. Therefore, the holding unit 310 can hold the conical part 306 securely by having the holding angle adjustment units 322a and 322c. Each holding angle adjustment units 322a and 322c may rotate the clamps 314a and 314c using an electric motor, respectively.

When holding the deposit 10, which has a large outside diameter shown by the phantom line, the holding angle adjustment units 322a and 322c rotate the clamps 314a and 314c in the direction shown by arrow. At this time, the holding angle adjustment units 322a and 322c rotate the clamps 314a and 314c so that the angle of the concave parts 312a and 312c to be substantially same with the angle of the inclination 320 of the conical part 306. Therefore, the holding unit 310 can hold the conical part 306 securely by rotating the clamps 314a and 314c using the holding angle adjustment units 322a and 322c even if the deposits 10 have different outside diameters.

Figure 20:
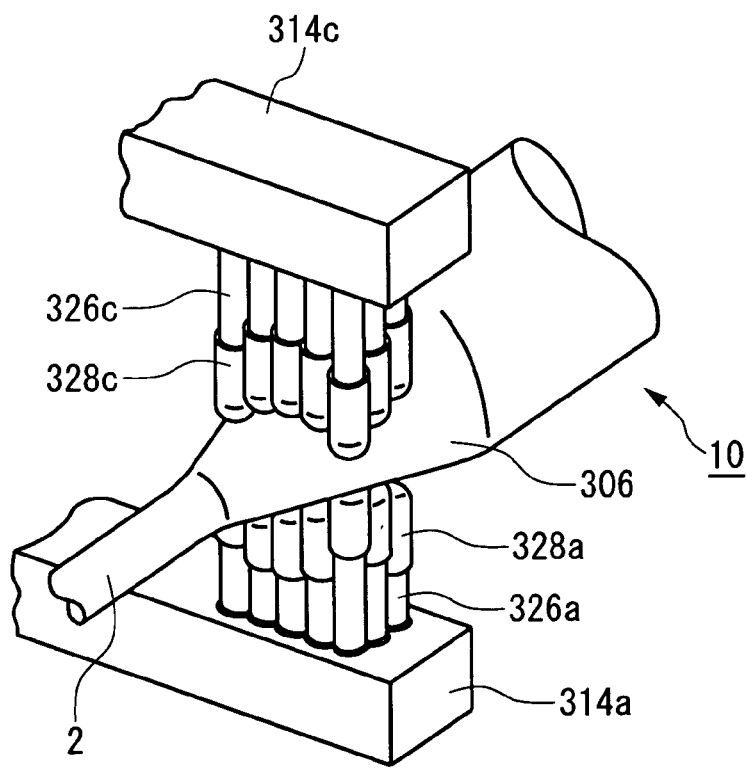
FIG. 20 shows other further embodiments of the holding unit 310.

FIG. 20 shows further other embodiments of the holding unit 310. The holding pressure adjustment unit of FIG. 20 has a plurality of columnar objects 326a and 326c each of which moves telescopically according to the curved surface of the conical part 306. A plurality of columnar objects 326a and 326c are installed in the corresponding clamps 314a and 314c, respectively. The tips 328a and 328c, the end of which are round, are formed at the tip of the columnar objects 326a and 326c in order not to damage the surface of the deposit 10. Since the tips 328a and 328c of the plurality columnar objects 326a and 326c move telescopically upwards and downwards according to the curved surface of the conical part 306, the holding unit 310 can hold the conical part 306 with uniform pressure.

EXAMPLE

The deposit 10 manufactured using the glass base material manufacturing apparatus 200 was transported outside the glass base material manufacturing apparatus 200 using the holding unit 310 shown in FIG. 15.

Both ends of the starting base material 2 were held by the chuck 12 in the reaction vessel 210. The deposit 10, which has the cylindrical part 304 on the center and the conical parts 306 on both ends, was manufactured by depositing glass soot around the outside surface of the starting base material 2 while rotating the starting base material 2. After the completion of the manufacture of the deposit 10, a practicable window 308 of the reaction vessel 210 was opened.

Next, two holding units 310 were inserted into the reaction vessel 210 from the practicable window 308 by extending the arm 318 inside the reaction vessel 210. Each holding unit 310 held the corresponding conical part 306 formed on both ends of the deposit 10, respectively. Each holding units 310 sandwiched the conical part 306 by inserting the concave part 312a–312c of the clamps 314a–314c into the conical part 306. For this reason, the deposit 10 was supported by the holding unit 310. Next, the chuck 12 was loosened, and the starting base material 2 was removed from the chuck 12. The arm 318 was contracted, and the deposit 10 was removed from the reaction vessel 210.

The track, to which the arm 318 was installed, was moved to the sintering apparatus for vitrifying the deposit 10 into transparent glass. By rotating or extending and contracting the arm 318, the deposit 10 was installed at the predetermined position of the sintering apparatus. Moreover, after the deposit 10 is removed from the reaction vessel 210, the deposit 10 maybe mounted on the track having the concave part 312a–312c similar to the holding unit 310 for transportation.

100 deposits 10 having a full length of 1500 mm and a weight of 100 kg were transported according to the above procedure using the holding unit 310. No damage was found in the cylindrical part 304 of all the deposits 10. Furthermore, no surface cracks or internal bubbles were found in the cylindrical part 304 of the deposits 10 when these 100 deposits 10 were sintered and vitrified into transparent glass.

Comparative Example 50 deposits 10 having a full length of 1500 mm and a weight of 100 kg were transported. The cylindrical part 304 of the deposit 10 was held and transported using the conventional holding unit. When the transported deposits 10 were sintered, cracks were found on the surface of the cylindrical part 304 of 45 glass base materials among 50 of the sintered glass base materials. Moreover, remaining bubbles were found inside the cylindrical part 304 of all 50 of the glass base materials.

Therefore, the deposit 10 can be transported without damaging the cylindrical 304 of the deposit 10 by using the holding unit 310 shown from FIG. 15 to FIG. 20.

The example for transporting the deposit 10 horizontally using the holding unit 310 was explained above. However, the transport direction of the deposit 10 is not limited to the horizontal direction, but the deposit 10 may be transported by rotating the longitudinal direction of the deposit 10 from the horizontal direction to the vertical direction, and the deposit 10 may be transported where the longitudinal direction of the deposit 10 is continuously arranged in the vertical direction.

Although the present embodiment has been described by way of exemplary embodiments, it should be understood that many changes and substitutions may be made by those skilled in the art without departing from the spirit and the scope of the present embodiment which is defined only by the appended claims.

What is claimed is:

1. A glass base material manufacturing apparatus for manufacturing a glass base material, which is used as a base material of an optical fiber, comprising:
   a plurality of burners, arranged in a row at predetermined intervals along a longitudinal direction of a starting base material of said glass base material, for forming a deposit, which is a base material of said glass base material by depositing glass soot on said starting base material while moving reciprocatorily over a section of an entire length of said starting base material along the longitudinal direction of said starting base material;
   a plurality of flow rate regulators, at least one of which is connected to said plurality of burners, respectively, for regulating a flow rate of raw material gas of said glass soot, which is supplied to said plurality of burners; and
   a control module connected to each of said plurality of flow rate regulators for controlling individually said plurality of flow rate regulators, said control module comprising:
      a first control unit which controls a plurality of said flow rate regulators so that said raw material gas of a base flow rate is supplied to said plurality of said burners; and
      a second control unit which controls each of said plurality of flow rate regulators according to a correction value of flow rate of said raw material gas supplied to said burners, said correction value being calculated for each of said plurality of burners over said base flow rate.

2. The glass base material manufacturing apparatus as claimed in claim 1, wherein said second control unit calculates said correction value for each of said plurality of flow rate regulators based on a deposition ratio of said glass base material, which is formed by vitrifying said deposit actually deposited by said plurality of burners.

3. The glass base material manufacturing apparatus as claimed in claim 2, wherein said second control unit adjusts said correction value for each of said plurality of flow rate regulators according to a ratio between a deposition ratio of first glass base material, which is formed by vitrifying said deposit formed by controlling said flow rate regulators using said first control unit corresponding to each positions of said plurality of burners, and a deposition ratio of second glass base material, which is formed by vitrifying said deposit formed by controlling said flow rate regulators using said first control unit and said second control unit.

4. The glass base material manufacturing apparatus as claimed in claim 2, wherein said control module is connected to a preform analyzer, which measures an outside diameter and a core diameter of said glass base material.

5. The glass base material manufacturing apparatus as claimed in claim 1, wherein said second control unit calculates said correction value to be 50% or less of said base flow rate.

6. The glass base material manufacturing apparatus as claimed in claim 1, wherein said first control unit controls said flow rate regulator so that an amount of said raw material gas supplied to said burners is changed with progress of time.

7. The glass base material manufacturing apparatus as claimed in claim 1, wherein said plurality of flow rate regulators is connected to one of said burners.

8. The glass base material manufacturing apparatus as claimed in claim 7, wherein said plurality of flow rate regulators controls flow rate of different types of said raw material gas, respectively.

9. The glass base material manufacturing apparatus as claimed in claim 1, further comprising:
   a first moving mechanism that moves said plurality of burners reciprocatorily in a first cycle along the longitudinal direction of said starting base material; and
   a second moving mechanism that moves said first moving mechanism reciprocatorily in a second cycle, the cycle of said second cycle being longer than said first cycle.

10. A glass base material manufacturing apparatus for manufacturing a glass base material, which is used as a base material of an optical fiber, comprising:
   a plurality of burners, arranged in a row at predetermined intervals along a longitudinal direction of a starting base material of said glass base material, for forming a deposit, which is a base material of said glass base material by depositing glass soot on said starting base material while moving reciprocatorily over a section of an entire length of said starting base material along the longitudinal direction of said starting base material;
   a plurality of flow rate regulators, at least one of which is connected to said plurality of burners, respectively, for regulating a flow rate of raw material gas of said glass soot, which is supplied to said plurality of burners;
   a control module connected to each of said plurality of flow rate regulators for controlling individually said plurality of flow rate regulators;

a reaction vessel which accommodates said plurality of burners; and a deformation reduction mechanism, which reduces a deformation of, said reaction vessel caused by heat generated when manufacturing said glass base material.

11. The glass base material manufacturing apparatus as claimed in claim 10, wherein said deformation reduction mechanism includes a flexural structure part formed in said reaction vessel.

12. The glass base material manufacturing apparatus as claimed in claim 11, wherein said flexural structure part is formed around said reaction vessel.

13. The glass base material manufacturing apparatus as claimed in claim 10, wherein said deformation reduction mechanism includes a deformation restriction unit, which restricts deformation of said reaction vessel.

14. The glass base material manufacturing apparatus as claimed in claim 13, wherein said deformation restriction unit is provided around a circumference of said reaction vessel.

15. The glass base material manufacturing apparatus as claimed in claim 14, wherein a material of said deformation restriction unit comprises carbon steel or stainless steel.

16. The glass base material manufacturing apparatus as claimed in claim 13, wherein the material of said deformation restriction unit comprises a steel pipe having a square cross section.

17. The glass base material manufacturing apparatus as claimed in claim 10, wherein said reaction vessel includes a wall, the surface of which has a continuous flexural shape, as said deformation reduction mechanism.

18. The glass base material manufacturing apparatus as claimed in claim 10, wherein said reaction vessel includes a slide part, in which a part of a wall of said reaction vessel slides to be overlapped with another part of said wall of said reaction vessel, as said deformation reduction mechanism.

19. The glass base material manufacturing apparatus as claimed in claim 18, wherein said slide part is formed around a circumference of said reaction vessel.

20. The glass base material manufacturing apparatus as claimed in claim 1, further comprising:

a holding unit, which holds said deposit and transports said deposit outside the glass base material manufacturing apparatus, wherein said holding unit includes a means to hold a conical part, which is formed on both ends of said deposit.

21. The glass base material manufacturing apparatus as claimed in claim 20, wherein said holding unit includes a concave part, an angle of which is substantially same as an inclination of an angle of said conical part of said deposit.

22. The glass base material manufacturing apparatus as claimed in claim 21, wherein said concave part comprises a curved groove.

23. The glass base material manufacturing apparatus as claimed in claim 21, wherein said concave part comprises a substantially V-shaped groove.

24. The glass base material manufacturing apparatus as claimed in claim 21, wherein said holding unit includes a clamp, which includes a concave part that holds said conical part by sandwiching said conical part from both an upper side and a lower side of said conical part.

25. The glass base material manufacturing apparatus as claimed in claim 24, wherein said plurality of clamps are rotated around an axis, which couples said plurality of clamps with each other.

26. The glass base material manufacturing apparatus as claimed in claim 21, wherein said holding unit comprises:

a clamp including said concave part, which holds said conical part by sandwiching said conical part; and a holding angle adjustment unit for adjusting an angle of said concave part of said clamp to be substantially same as an angle of an inclination of a part of said conical part.

27. The glass base material manufacturing apparatus as claimed in claim 26, wherein said holding angle adjustment unit rotates said clamp around a longitudinal direction of said clamp as an axis.

28. The glass base material manufacturing apparatus as claimed in claim 20, wherein said holding unit includes a holding pressure adjustment unit for holding said conical part by substantially uniform pressure.

29. The glass base material manufacturing apparatus as claimed in claim 28, wherein said holding pressure adjustment unit comprises an elastic body formed on a surface of said clamp that contacts with said conical part.

30. The glass base material manufacturing apparatus as claimed in claim 28, wherein said holding pressure adjustment unit includes a plurality of columnar objects each of which moves telescopically according to a curved surface of said conical part.

31. The glass base material manufacturing apparatus as claimed in claim 24, wherein said holding unit includes a mechanism for adjusting a position of said clamp in an axial direction of said deposit.

32. The glass base material manufacturing apparatus as claimed in claim 31, wherein said mechanism for adjusting said position of said clamp includes an arm that supports said clamp and screw shaft which engages with said arm and moves said arm in the axial direction of said deposit.

33. The glass base material manufacturing apparatus as claimed in claim 9, wherein said second moving mechanism is provided on a lower part of the first moving mechanism, and wherein said second moving mechanism moves said first moving mechanism reciprocatorily.

34. The glass base material manufacturing apparatus as claimed in claim 9, wherein said first moving mechanism has a first moving axis arranged in parallel with the longitudinal direction of the starting base material, and wherein said second moving mechanism has a second moving axis arranged in parallel with a longitudinal direction of said first moving axis.

* * * * *